United States Patent
Melanson et al.

(10) Patent No.: US 9,863,365 B2
(45) Date of Patent: *Jan. 9, 2018

(54) SUPPLYING GASEOUS FUEL FROM A LIQUID STATE TO AN INTERNAL COMBUSTION ENGINE

(71) Applicant: Westport Power Inc., Vancouver (CA)

(72) Inventors: Bradley E. Melanson, Vancouver (CA); David K. Mumford, Vancouver (CA); Paul M. Blomerus, Vancouver (CA); Melissa S. A. McKinnon, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 246 days.

This patent is subject to a terminal disclaimer.

(21) Appl. No.: 14/561,184

(22) Filed: Dec. 4, 2014

(65) Prior Publication Data
US 2015/0083055 A1 Mar. 26, 2015

Related U.S. Application Data

(63) Continuation of application No. PCT/CA2013/050390, filed on May 22, 2013.

(30) Foreign Application Priority Data

Jun. 5, 2012 (CA) ...................................... 2779150

(51) Int. Cl.
F02B 63/04 (2006.01)
F02G 5/04 (2006.01)
F02M 21/02 (2006.01)

(52) U.S. Cl.
CPC ................ *F02G 5/04* (2013.01); *F02B 63/04* (2013.01); *F02M 21/02* (2013.01); *Y02T 10/16* (2013.01); *Y02T 10/32* (2013.01)

(58) Field of Classification Search
CPC ............ F02G 5/04; F02B 63/04; F02M 21/02
See application file for complete search history.

(56) References Cited

U.S. PATENT DOCUMENTS 5,375,580 A 12/1994 Stolz et al.
5,441,234 A 8/1995 White et al.
(Continued)

FOREIGN PATENT DOCUMENTS

WO 2007147008 A2 12/2007
WO 2010074694 A1 7/2010

OTHER PUBLICATIONS

International Search Report and Written Opinion of the International Searching Authority dated Jul. 22, 2013, in connection with International Application No. PCT/CA2013/050390.
(Continued)

*Primary Examiner* — Kevin A Lathers
(74) *Attorney, Agent, or Firm* — Carie C. Mager; C. Larry Kyle

(57) ABSTRACT

An improved apparatus supplies gaseous fuel from a liquid state to an internal combustion engine comprising an electrical energy generating apparatus for generating electrical energy from a store of chemical energy. A liquid pumping apparatus for pumping the gaseous fuel in the liquid state includes an energy converter for converting the electrical energy to mechanical energy which drives the liquid pumping apparatus. The liquid pumping apparatus also includes a first heat exchanger for vaporizing the gaseous fuel received from the pumping apparatus and a controller programmed to operate the liquid pumping apparatus to maintain a pressure of the gaseous fuel supplied to the internal combustion engine within a predetermined range.

15 Claims, 21 Drawing Sheets

(56) References Cited

U.S. PATENT DOCUMENTS

| | | | |
|---|---|---|---|
| 5,566,712 A | 10/1996 | White et al. | |
| 5,887,567 A | 3/1999 | White et al. | |
| 8,763,565 B2 * | 7/2014 | Dunn | F02M 21/0209 123/27 GE |
| 2002/0166545 A1 * | 11/2002 | Stone | F01N 5/02 123/527 |
| 2006/0053806 A1 * | 3/2006 | Tassel | B63B 25/16 62/48.1 |
| 2006/0130470 A1 | 6/2006 | Dorn et al. | |
| 2011/0048374 A1 | 3/2011 | McAlister | |
| 2012/0060935 A1 * | 3/2012 | Carter | F02M 21/0221 137/14 |
| 2015/0219044 A1 * | 8/2015 | Melanson | F02M 21/06 60/710 |

OTHER PUBLICATIONS

International Preliminary Report on Patentability and Written Opinion of the International Bureau dated Dec. 9, 2014, in connection with PCT/CA2013/050390.

"An evaluation of natural gas-fueled locomotives", published by BNSF Railway Company, Union Pacific Railroad Company (UPRR), the Association of American Railroads, and the California Environmental Associates, Nov. 2007.

"LNG as a fuel for railroads: Assessment of technology status and economics", published by Gas Research Institute, Bob Kirkland of Air Products and Chemicals, Jan. 1993.

* cited by examiner

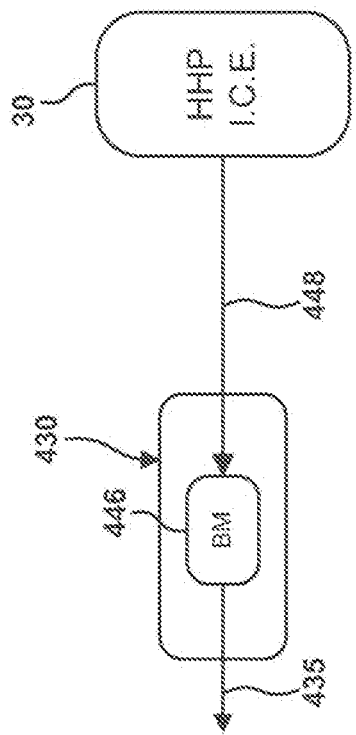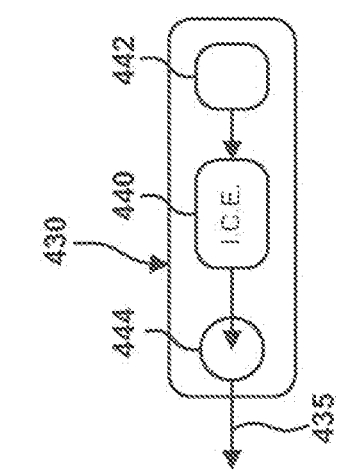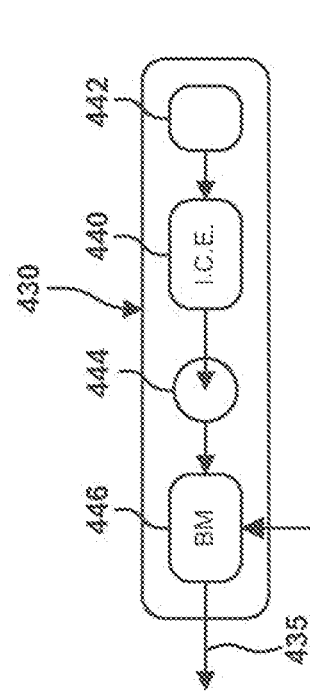
FIG. 16
FIG. 15
FIG. 17

SUPPLYING GASEOUS FUEL FROM A LIQUID STATE TO AN INTERNAL COMBUSTION ENGINE

CROSS-REFERENCE TO RELATED APPLICATIONS

This application is a continuation of International Application No. PCT/CA2013/050390 having a filing date of May 22, 2013, entitled "Supplying Gaseous Fuel from a Liquid State to an Internal Combustion Engine", which is related to and claims priority benefits from Canadian patent application No. 2,779,150 filed on Jun. 5, 2012, also entitled "Supplying Gaseous Fuel from a Liquid State to an Internal Combustion Engine". The '390 international application is hereby incorporated by reference herein in its entirety.

FIELD OF THE INVENTION

The present application relates to a technique for supplying gaseous fuel stored in a liquid state to an internal combustion engine employed in a high-horsepower application.

BACKGROUND OF THE INVENTION

High-horsepower engines fuelled with a gaseous fuel stored in a liquid state are employed in a variety of applications among which are locomotives, marine vessels, mining, mine haul trucks and power generation. Even though requirements can vary, common technical challenges exist across these applications. Fuel storage vessels can be large and difficult to co-locate with the engine due to the relatively large volume of fuel consumed. In locomotive applications in particular, the locomotive does not have sufficient space to locate a liquefied gaseous fuel storage vessel on board, which must be located on an alternative railroad car near the locomotive. Another challenge is related to thermal management of a heat exchanger employed to vaporize the liquefied gaseous fuel before introduction into the engine. Normally waste heat is the primary heat source for vaporizing the liquefied fuel which results in the best engine efficiency. On cold start the engine coolant temperature is low and there is a risk of freezing the vaporizer due to the relatively large flow rates. To mitigate this risk a secondary source of heat is advantageous during at least engine cold start to prevent vaporizer freeze. Traditional sources of energy from the preexisting engine could be used to generate this heat, but in many applications these energy sources may not be able to supply the amount of energy required by the vaporizer.

Two development goals for high-horsepower engines fuelled with liquefied gas are to have lower emissions than, and a power level similar to, an equivalent diesel engine. This engine would have wide adoption in the foregoing applications. The development of such an engine has been attempted in the locomotive industry with little success. Another development goal is a high-horsepower engine that can be employed in any of the foregoing applications without any or very little modification or reconfiguration. High-horsepower applications comprise technical challenges which, although present in lower horsepower applications, are exacerbated at the higher power level. These challenges comprise, among others, ignition and combustion stability which are related in some manner to fuel pressure, and thermal management of the fuel supply.

Since the early 1980s several research projects and demonstration programs have attempted to employ natural gas as a fuel for locomotives. The initial motivation was to determine if reduction in emission levels could be obtained compared to diesel locomotives, while maintaining the same level of power. These efforts were driven by evolving emission standards for locomotives from the Environment Protection Agency (EPA), for which in 1997 the EPA established Tier 0, 1 and 2 standards, and more recently in 2008 they set the Tier 3 and 4 standards. Both the Tier 3 and 4 standards dramatically reduce emissions of diesel particulate matter (PM) and nitrogen oxide (Ox). Out of these efforts only one proven and tested commercially available natural gas fuelled line-haul locomotive emerged, which employed a low pressure injection technology. In a paper titled "An Evaluation of Natural Gas-fueled Locomotives", published in November 2007 by BNSF Railway Company, Union Pacific Railroad Company (UPRR), the Association of American Railroads, (together known as the Railroads) and the California Environmental Associates, the Railroads position on natural gas fuelled locomotives was presented. Except for some potential niche applications, the Railroads expressed their belief that there was no viable opportunity to use natural gas as a locomotive fuel to help meet emissions and performance goals. This position was based on those research projects and demonstration programs and the one known commercially available natural gas fuelled line-haul locomotive available in North America. This commercially available product was da conversion kit for the EMD 645 two-stroke diesel engine that enabled the locomotive to run on liquefied natural gas (LNG) as a primary fuel, while employing diesel as a pilot fuel. The LNG fuel is vaporized and injected at low pressure (85-125 pounds per square inch (psi)) such that the fuel and air mix during compression. A small portion of diesel "pilot" fuel is then injected into the cylinder at the top of the stroke where it auto-ignites to facilitate combustion.

Several of the research projects and demonstration programs attempted high pressure injection techniques where natural gas fuel was injected late in the compression cycle. In 1992 the UPRR began two of these efforts in separate programs with Electro Motive Diesel (EMD) and GE Transportation Systems (GE) to investigate the use of natural gas in line-haul, high-horsepower locomotive engines. This was a significant, multi-year effort in which UPRR expended over $15 million exploring basic engine and fueling technology issues. The natural gas injection pressures employed in both the EMD and GE systems were in the range between 3000 psi and 4500 psi. Due to technical limitations, the locomotives developed separately by EMD and GE were incapable of revenue operation. The technical difficulties in both programs included failure of gas injectors, failure of cryogenic LNG pumps for handling the cryogenic fuel between the tender tanks and the locomotives, the engine control system software, the gas transition control system software, and fuel system joint leaks.

The conversion kit for the EMD 645 (the commercially available product mentioned above) developed out of a project started by Burlington Northern Railroad (BN) in 1987 involving a two pronged effort to develop natural gas fueling infrastructure and line-haul locomotives capable of running on natural gas. For the fueling infrastructure, BN worked with Air Products and Chemicals (APC) to develop fueling locations and cryogenic tank-equipped tender cars to support the use of Refrigerated Liquid Methane (RLM), a high purity form of liquefied natural gas, as a locomotive fuel. In a paper titled "LNG as a Fuel for Railroads:

Assessment of Technology Status and Economics", published by the Gas Research Institute in January 1993, Bob Kirkland of APC indicates that LNG vaporization can be performed on the locomotive or on the tender car. "As less energy is needed to pump a liquid than to compress a gas, future tender car designs will likely deliver liquid to a pump located on the locomotive and upstream of the vaporizer. It would be impractical, according to Bob Kirkland, for the tender car to supply high pressure liquid to the locomotive. Such an arrangement would involve long lengths of high-pressure piping as well as additional hardware between the locomotive and the tender car to power the pump."

Based on the admissions of the Railroads and the results of the research and demonstration projects cited above it is evident that late cycle, high pressure direct injection of natural gas in a locomotive engine is not a straightforward or obvious undertaking. Several technical challenges exist that have prevented a commercially available natural gas locomotive from emerging that can challenge and improve upon the emissions from so called clean diesel locomotive technologies. Similar challenges exist in employing natural gas as a fuel for internal combustion engines employed in marine applications for powering and propelling ships, in mining and mine haul trucks, and in power generation.

In light of the foregoing, there is a need for both a low pressure and high pressure fuel apparatus for high-horsepower engines that is adaptable for varying applications, and which solves technical challenges related to fuel pressure and thermal management. The present application provides an improved technique for supplying a gaseous fuel stored in a liquefied state to an internal combustion engine employed in a high-horsepower application.

SUMMARY OF THE INVENTION

An improved method for supplying gaseous fuel from a liquid state to an internal combustion engine comprises generating electrical energy from a store of chemical energy; pumping the gaseous fuel in the liquid state by transforming the electrical energy into mechanical work; vaporizing the gaseous fuel pumped from the liquid state; and delivering the gaseous fuel vaporized from the liquid state to the internal combustion engine. The gaseous fuel delivered to the internal combustion engine is maintained at a pressure within a predetermined range by the pumping. The store of chemical energy can comprise at least one of a battery and a combustible fuel. The method can further comprise generating waste heat by operating the internal combustion engine; and vaporizing the gaseous fuel pumped from the liquid state with the waste heat. The method can further comprise generating heat by transforming the electrical energy into thermal energy; and vaporizing the gaseous fuel pumped from the liquid state with the heat. The method can also comprise generating heat by burning boil-off gas from the gaseous fuel in the liquid state; and vaporizing the gaseous fuel pumped from the liquid state with the heat.

When the electrical energy and the internal combustion engine are employed as sources of generating heat, the method can further comprise generating heat by transforming the electrical energy into thermal energy at least before the internal combustion engine starts; vaporizing the gaseous fuel pumped from the liquid state with the heat; generating waste heat by operating the internal combustion engine; and vaporizing the gaseous fuel pumped from the liquid state with the waste heat. Similarly, the method can further comprise generating heat by burning boil-off gas from the gaseous fuel in the liquid state at least before the internal combustion engine starts; vaporizing the gaseous fuel pumped from the liquid state with the heat; generating heat by operating the internal combustion engine; and vaporizing the gaseous fuel pumped from the liquid state with the waste heat.

When the store of chemical energy is the combustible fuel, the method can further comprise consuming the combustible fuel in a second internal combustion engine; and driving an electrical generator with the second internal combustion engine such that the electrical generator generates the electrical energy. An advantage of this approach is that the second internal combustion engine can be much smaller than the internal combustion engine that is used to provide the main power to the locomotive, marine vessel, mine haul truck, generator or other power uses. Waste heat generated by operating the second internal combustion engine can be employed to vaporize the gaseous fuel pumped from the liquid state. In addition to employing the waste heat, heat can also be generated by transforming the electrical energy into thermal energy which can then be employed to vaporize the gaseous fuel pumped from the liquid state. Heat can further be generated by burning boil-off gas from the gaseous fuel in the liquid state which can be employed to vaporize the gaseous fuel pumped from the liquid state.

An improved apparatus for supplying gaseous fuel from a liquid state to an internal combustion engine comprises an electrical energy generating apparatus for generating electrical energy from a store of chemical energy; a liquid pumping apparatus for pumping the gaseous fuel in the liquid state comprises an energy converter for converting the electrical energy to mechanical energy which drives the liquid pumping apparatus; a first heat exchanger for vaporizing the gaseous fuel received from the pumping apparatus; and a controller programmed to operate the liquid pumping apparatus to maintain a pressure of the gaseous fuel supplied to the internal combustion engine within a predetermined range. The apparatus can further comprise a second heat exchanger for heating a heat exchange fluid by transferring waste heat from the internal combustion engine to the heat exchange fluid; wherein the heat exchange fluid transfers heat to the gaseous fuel in the first heat exchanger for vaporizing the gaseous fuel in the liquid state. Similarly, the apparatus can further comprise a second heat exchanger for heating a heat exchange fluid by transforming the electrical energy into heat; such that the heat exchange fluid transfers heat to the gaseous fuel in the first heat exchanger for vaporizing the gaseous fuel in the liquid state. Similarly again, the apparatus can further comprise a second heat exchanger for heating a heat exchange fluid by generating heat by burning boil-off gas from the gaseous fuel in the liquid state; such that the heat exchange fluid transfers heat to the gaseous fuel in the first heat exchanger for vaporizing the gaseous fuel in the liquid state.

The apparatus can further comprise a second heat exchanger for heating a heat exchange fluid by transferring waste heat from the internal combustion engine to the heat exchange fluid; and at least one more heat exchanger operable for one of heating the heat exchange fluid by transforming the electrical energy into heat; and heating the heat exchange fluid with heat generated by burning boil-off gas from the gaseous fuel in the liquid state; wherein the heat exchange fluid transfers heat to the gaseous fuel in the first heat exchanger for vaporizing the gaseous fuel in the liquid state.

The apparatus can further comprise a heat exchange loop comprising engine coolant from the internal combustion engine as a heat exchange fluid, whereby the heat exchange fluid transfers heat to the gaseous fuel in the first heat exchanger for vaporizing the gaseous fuel in the liquid state. The apparatus can further comprise at least one more heat exchanger operable for one of heating the heat exchange fluid by transforming the electrical energy into heat; and heating the heat exchange fluid with heat generated by burning boil-off gas from the gaseous fuel in the liquid state.

The apparatus can further comprise a first heat exchange loop comprising engine coolant from the internal combustion engine as a first heat exchange fluid, the first heat exchange fluid transfers heat to the gaseous fuel in the first heat exchanger for vaporizing the gaseous fuel in the liquid state; and a second heat exchange loop comprising a second heat exchange fluid, the second heat exchange fluid transfers heat to the gaseous fuel in the first heat exchanger for vaporizing the gaseous fuel in the liquid state; at least one more heat exchanger operable for one of heating the second heat exchange fluid by transforming the electrical energy into heat; and heating the second heat exchange fluid with heat generated by burning boil-off gas from the gaseous fuel in the liquid state.

When the store of chemical energy is a combustible fuel, the apparatus can further comprise a second internal combustion engine for consuming the combustible fuel; an electrical generator driven by the second internal combustion engine for generating the electrical energy; and piping conduit for communicating waste heat in a heat exchange fluid from the second internal combustion engine to the first heat exchanger; whereby the waste heat vaporizes the gaseous fuel. The apparatus can further comprise a second heat exchanger for heating the heat exchange fluid by transforming the electrical energy into heat thereby increasing a temperature of the heat exchange fluid. The apparatus can further comprise a second heat exchanger for heating the heat exchange fluid by burning boil-off gas from the gaseous fuel in the liquid state thereby increasing a temperature of the heat exchange fluid.

BRIEF DESCRIPTION OF THE DRAWINGS

FIG. 15 is an energy supply for supplying electrical energy to the embodiments of FIGS. 1 to 14 according to one embodiment.

FIG. 16 is an energy supply for supplying electrical energy to the embodiments of FIGS. 1 to 14 according to another embodiment.

FIG. 17 is an energy supply for supplying electrical energy to the embodiments of FIGS. 1 to 14 according to another embodiment.

DETAILED DESCRIPTION OF PREFERRED EMBODIMENT(S)

Figure 1:
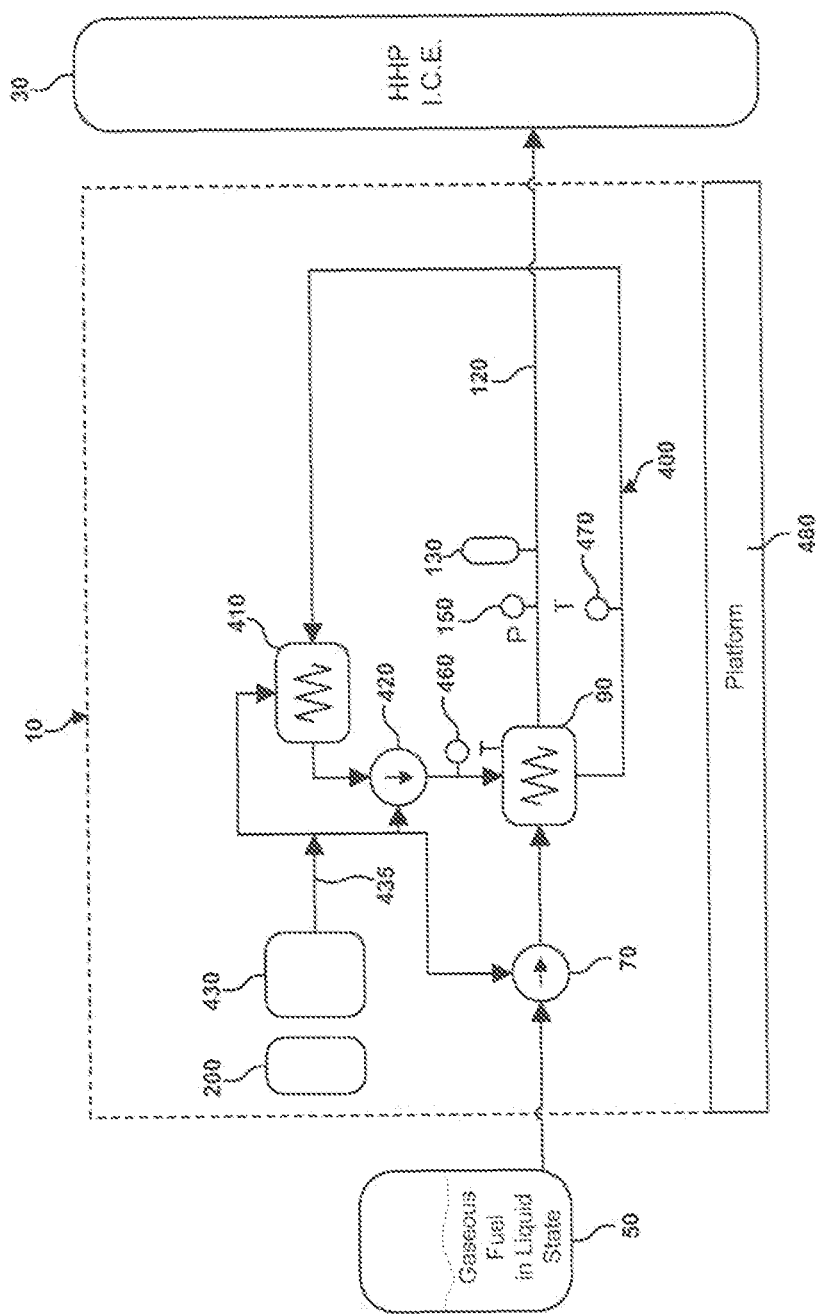
FIG. 1 is a schematic view of a fuel apparatus for supplying gaseous fuel from a liquid state to an internal combustion engine according to a first embodiment.

Referring to the figures and first to FIG. 1, there is shown fuel apparatus 10 for supplying a gaseous fuel from a storage vessel 50 to an internal combustion engine 30. Storage vessel 50 stores gaseous fuel at cryogenic temperatures as a multi-phase fluid. As used herein a gaseous fuel is one that is in a gaseous phase at standard temperature and pressure (STP). An exemplary gaseous fuel is natural gas, but other types of gaseous fuel are considered within the scope of the present disclosure and technique, such as ethane, methane, propane, biogas, landfill gas, dimethyl ether, hydrogen and mixtures thereof. As used herein the terms gaseous fuel and gas are used interchangeably, and the terms liquefied gas or liquefied gaseous fuel refer to a gaseous fuel in a liquid state. As is understood by those skilled in the technology, a gaseous fuel exists as a multi-phase fluid when stored at cryogenic temperatures near the boiling point. Engine 30 comprises conventional components associated with a gaseous fuelled internal combustion engine. Fuel apparatus 10 can be employed in high horsepower applications such as locomotives, marine vessels, mining, mine haul trucks and power generation. As used herein a high-horsepower engine can deliver at least 900 horsepower, and when the gaseous fuel is natural gas requires fuel apparatus 10 to provide at least 130 kg/hr of gaseous fuel. Apparatus 10 can be configured to deliver gaseous fuel at low pressure and/or high pressure to engine 30. Describing fuel apparatus 10 in more detail, pump apparatus 70 pumps liquefied gas from vessel 50 towards heat exchanger 90 where the gaseous fuel is transitioned into a gas phase and conveyed to internal combustion engine 30 over conduit 120. Accumulator 130 stores a predetermined volume of the gas to reduce fuel pressure fluctuations in conduit 120 due to changing operating conditions of engine 30. In other embodiments conduit 120 is selected to have a volume equal to the predetermined volume of gas such that accumulator 130 is not required. When delivering high pressure gas to engine 30, pump apparatus 70 can comprise a low pressure liquid fuel pump followed by a high pressure liquid fuel pump. That is, pump apparatus 70 can be a single stage pump, a single pump apparatus with a plurality of stages in series, or a plurality of pumps joined in series or parallel. Heat exchanger 90 is a vaporizer which employs a heat exchange fluid that circulates within loop 400 in apparatus 10. Loop 400 comprises heat exchanger 410 and pump 420. Heat exchanger 410 elevates the temperature of the heat exchange fluid in loop 400 by transforming electrical energy into thermal energy, for example by an electric heater, which is then employed to heat the fluid. Any conventional type of electric heater can be employed, such as a resistance heater, an induction heater and a di-electric heater. Pump 420 circulates the fluid around loop 400 and can be located at locations in loop 400 other than that shown in FIG. 1. Energy supply 430 provides electrical energy through conductors 435 to power pump apparatus 70, heat exchanger 410 and pump 420. Pump apparatus 70 and pump 420 comprise respective energy converters to transform electrical energy into mechanical energy that can be employed to do mechanical work (pumping). There are advantages for powering the components in fuel apparatus 10 with electrical energy instead of with mechanical energy. When powered with electrical energy, pump apparatus 70 and pump 420 do not need to be mechanically synchronized to engine 30, or any other internal combustion engine in apparatus 10. This simplifies and reduces the cost of fuel apparatus 10. In conventional liquefied gas engine systems waste heat from the engine is employed to vaporize the liquefied gas. Typically, waste heat comprises heat transferred to engine coolant from the engine block and/or from heat collected from exhaust gases. In these systems there is a risk of freezing the vaporizer on startup and at other points in the operating map of the engine due to inadequate heat exchange to the liquefied gas. For example, when engine 30 starts, the engine coolant may not be at a high enough temperature in order to fully vaporize the liquefied gas flowing through vaporizer 90 which can freeze the vaporizer and block fuel flow. This risk is reduced by employing electrical energy in heat exchanger 410 to heat the fluid in loop 400 which is then used to vaporize the gaseous fuel. By decoupling the energy source for vaporizing the gaseous fuel in vaporizer 90 from engine 30 the risk of the vaporizer freezing is reduced, at least for those points in the operating map of engine 30 when engine coolant temperature is insufficient for the heating requirements of the vaporizer. Temperature sensors 460 and 470 measure the temperature of the heat exchange fluid in loop 400 before and after vaporizer 90 such that the heating of the fluid in heat exchanger 410 can be controlled. In other embodiments at least one of the temperature sensors 460 and 470 is employed. Pressure sensor 150 measures the pressure of the gaseous fuel in conduit 120 such that pump apparatus 70 can be controlled to pressurize the gaseous fuel in conduit 120 to within a predetermined range. Electronic controller 200 communicates with the foregoing components in fuel apparatus 10 for receiving measured parameters and status information and for controlling their operation accordingly. In other embodiments another electronic controller, for example in engine 30, can replace controller 200. Fuel apparatus 10 can comprise other components such as electronic valves, pressure relief valves, metering valves, pressure regulators and dome-loaded regulators. In some applications it is convenient when the components within fuel apparatus 10 are co-located on platform 480 such that apparatus 10 can be installed in a modular fashion. For example on a locomotive, on a tender car, within the engine compartment of a marine vessel, on a mine haul truck and in a power generating facility.

Figure 2:
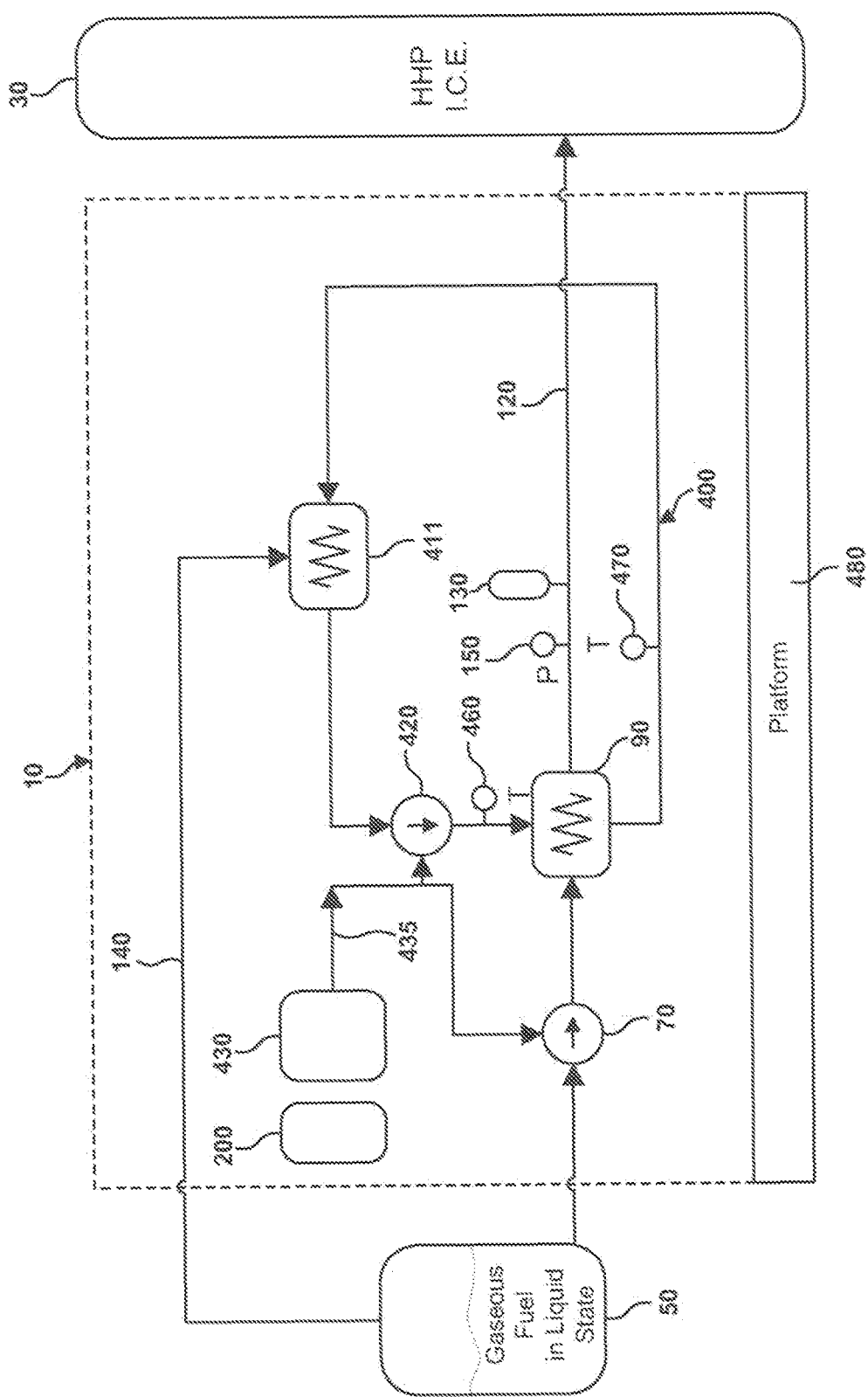
FIG. 2 is a schematic view of a fuel apparatus for supplying gaseous fuel from a liquid state to an internal combustion engine according to a second embodiment.

Referring now to FIG. 2, fuel apparatus 10 is shown according to a second embodiment that is similar to the embodiment of FIG. 1 and with respect to this second embodiment and subsequently described embodiments like parts have like reference numerals and may not be described in detail, if at all. Heat exchange loop 400 comprises heat exchanger 411 which elevates the temperature of the heat exchange fluid within loop 400 by burning boil-off gas delivered over conduit 140 from vessel 50. An accumulator (not shown) can be connected with conduit 140, or conduit 140 can be sized to store a predefined volume of boil-off gas such that a supply of gas is available for heat exchanger 411. In other embodiments pressurized gas from conduit 120 can be diverted to conduit 140 (or the accumulator) or directly to heat exchanger 411 when the supply of boil-off gas is below a level required for operation of vaporizer 90 based on operating conditions of engine 30. The liquefied gas within vessel 50 is normally near its boiling temperature. Due to heat leak into vessel 50, over time the liquefied gas can boil, which increases the vapor pressure within the vessel. Normally the vapor in the vessel is vented in some manner such that the vapor pressure can be maintained below a predetermined value. Quite often the vapor in vessel 50 is vented to atmosphere, which is wasteful and increases greenhouse gas concentration. It is advantageous to burn the vapor from the vessel in heat exchanger 411 to create heat that is employed to vaporize the liquefied gas in vaporizer 90.

Figure 3:
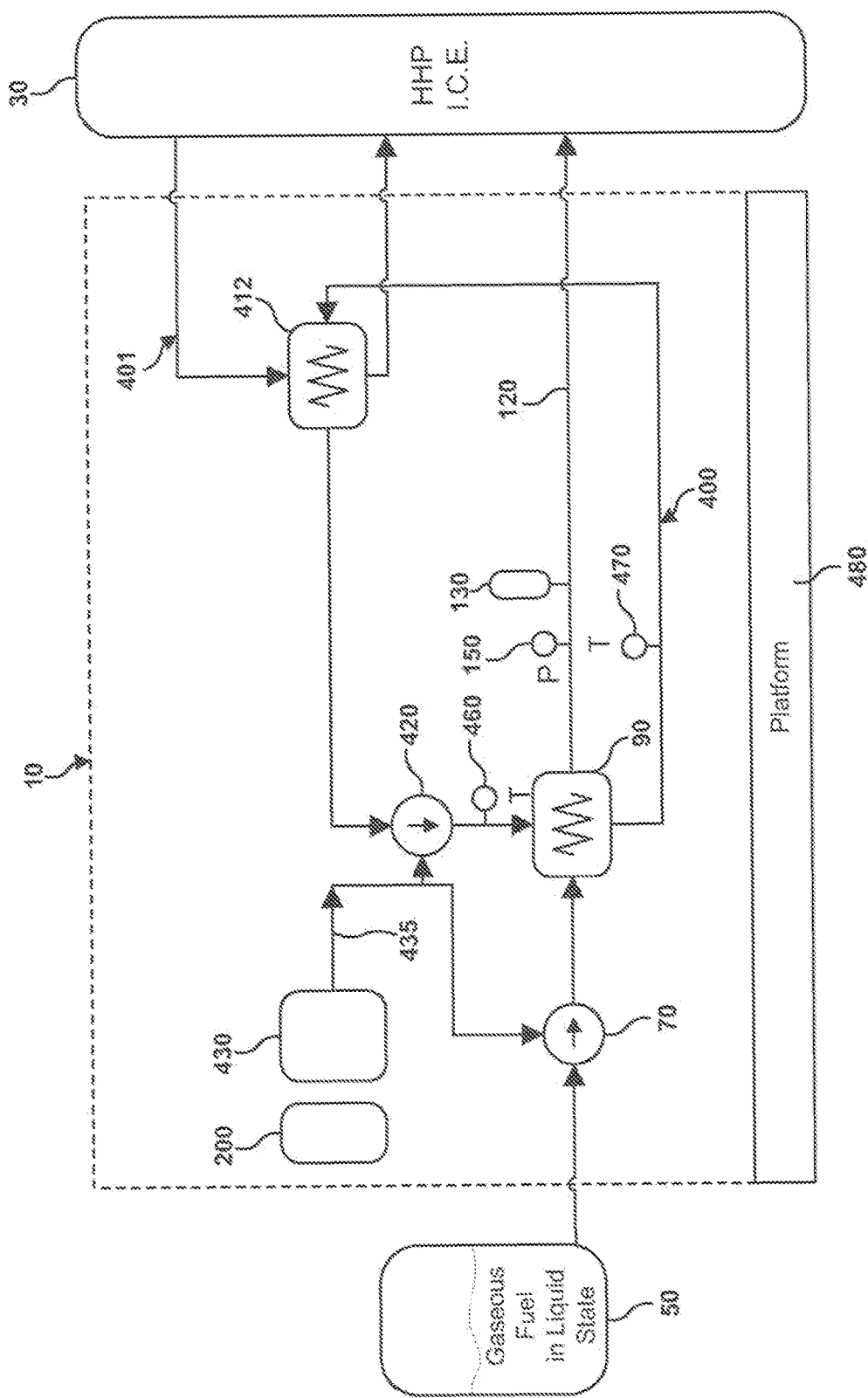
FIG. 3 is a schematic view of a fuel apparatus for supplying gaseous fuel from a liquid state to an internal combustion engine according to a third embodiment.

Referring now to FIG. 3, fuel apparatus 10 is shown according to a third embodiment. Heat exchange loop 400 comprises heat exchanger 412 which elevates the temperature of the heat exchange fluid within loop 400 by employing waste heat in engine coolant from engine 30. Engine coolant loop 401 circulates through heat exchanger 412 to transfer thermal energy to the fluid in loop 400. It is advantageous to employ the waste heat from engine 30 in vaporizer 90 since it increases the efficiency of fuel apparatus 10 by employing thermal energy already created by combustion of gaseous fuel from vessel 50.

Figure 4:
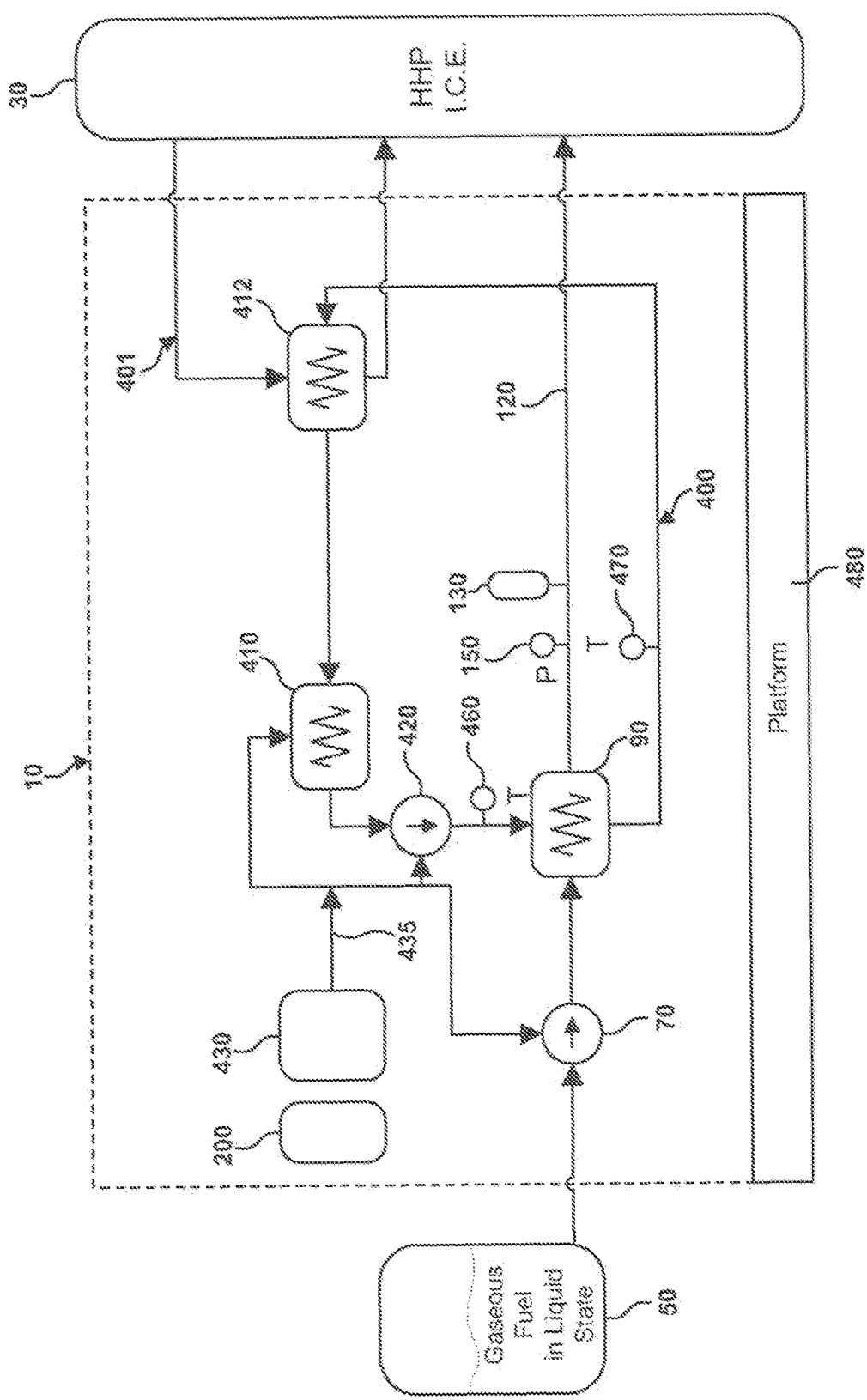
FIG. 4 is a schematic view of a fuel apparatus for supplying gaseous fuel from a liquid state to an internal combustion engine according to a fourth embodiment.

Referring now to FIG. 4, fuel apparatus 10 is shown according to a fourth embodiment. Heat exchange loop 400 comprises heat exchangers 410 and 412. In operation the liquefied gas from vessel 50 is vaporized by waste heat from engine 30, which is transferred to the fluid in loop 400 by heat exchanger 412. However, during periods when the engine coolant does not have high enough temperature to support the fuel flow requirement through vaporizer 90 and prevent, or at least reduce, freezing, then heat exchanger 410 can be employed to increase the temperature of the fluid in loop 400. For example, heat exchanger 410 can be employed during start-up and high fuel flow rate operation of engine 30, and during cold weather operation when the engine coolant temperature is lower than normal.

Figure 5:
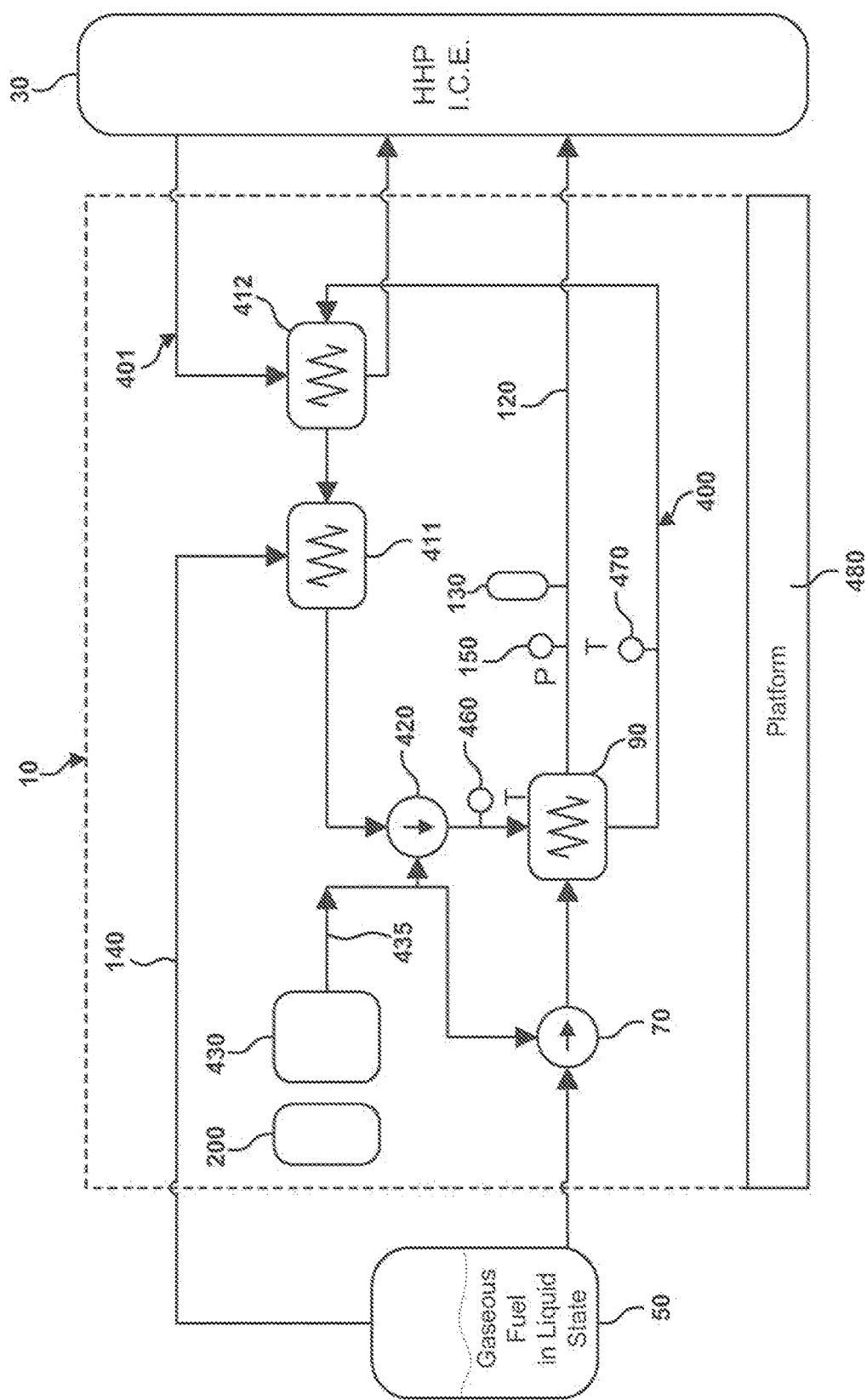
FIG. 5 is a schematic view of a fuel apparatus for supplying gaseous fuel from a liquid state to an internal combustion engine according to a fifth embodiment.

Referring now to FIG. 5, fuel apparatus 10 is shown according to a fifth. Heat exchange loop 400 comprises heat exchangers 411 and 412. In operation the liquefied gas is vaporized by waste heat from engine 30, which is transferred to the fluid in loop 400 by heat exchanger 412. However, during periods when the engine coolant of engine 30 in loop 401 does not have high enough temperature to support the fuel flow requirement through vaporizer 90 and prevent freezing then heat exchanger 411 can be employed to increase the temperature of the fluid in loop 400. For example, heat exchanger 411 can be employed during start-up and high fuel flow rate operation of engine 30, and during cold weather operation when the coolant temperature is lower than normal.

Figure 6:
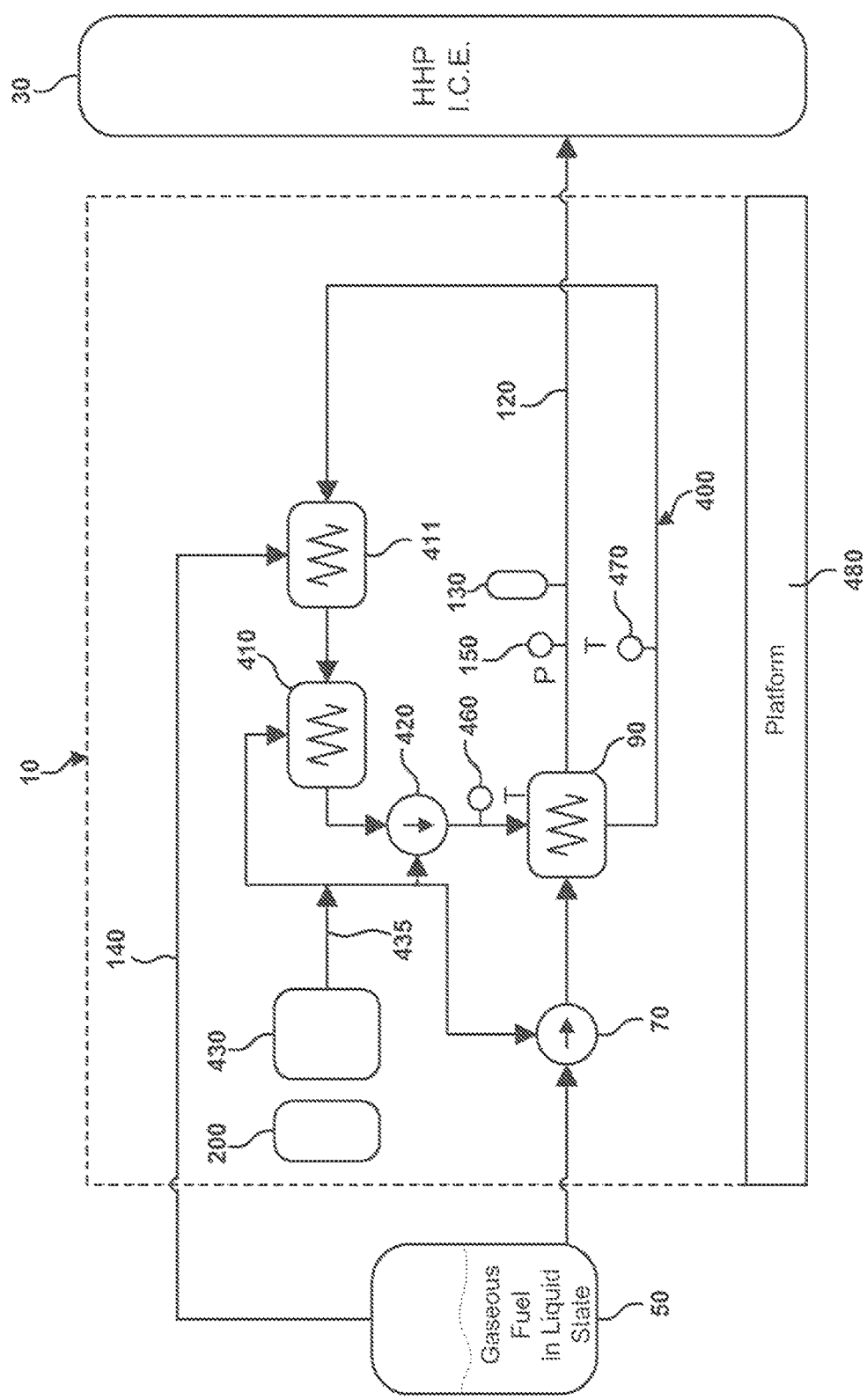
FIG. 6 is a schematic view of a fuel apparatus for supplying gaseous fuel from a liquid state to an internal combustion engine according to a sixth embodiment.

Referring now to FIG. 6, fuel apparatus 10 is shown according to a sixth embodiment. Heat exchange loop 400 comprises heat exchangers 410 and 411. In this embodiment either of the heat exchanges 410 and 411 can be employed to elevate the temperature of the heat exchange fluid in loop 400. In one mode of operation, heat exchanger 411 is employed to heat the fluid in loop 400. Heat exchanger 410 is employed to assist or replace heat exchanger 411 when the pressure of boil-off gas within vessel 50 drops too low to support the fuel flow rate requirement through vaporizer 90 and prevent, or at least reduce, freezing. In another mode, heat exchanger 410 is employed to heat the fluid in loop 400, and heat exchanger 411 is employed to heat the fluid when the pressure of boil-off gas rises above a predetermined value such that the pressure is reduced.

Figure 7:
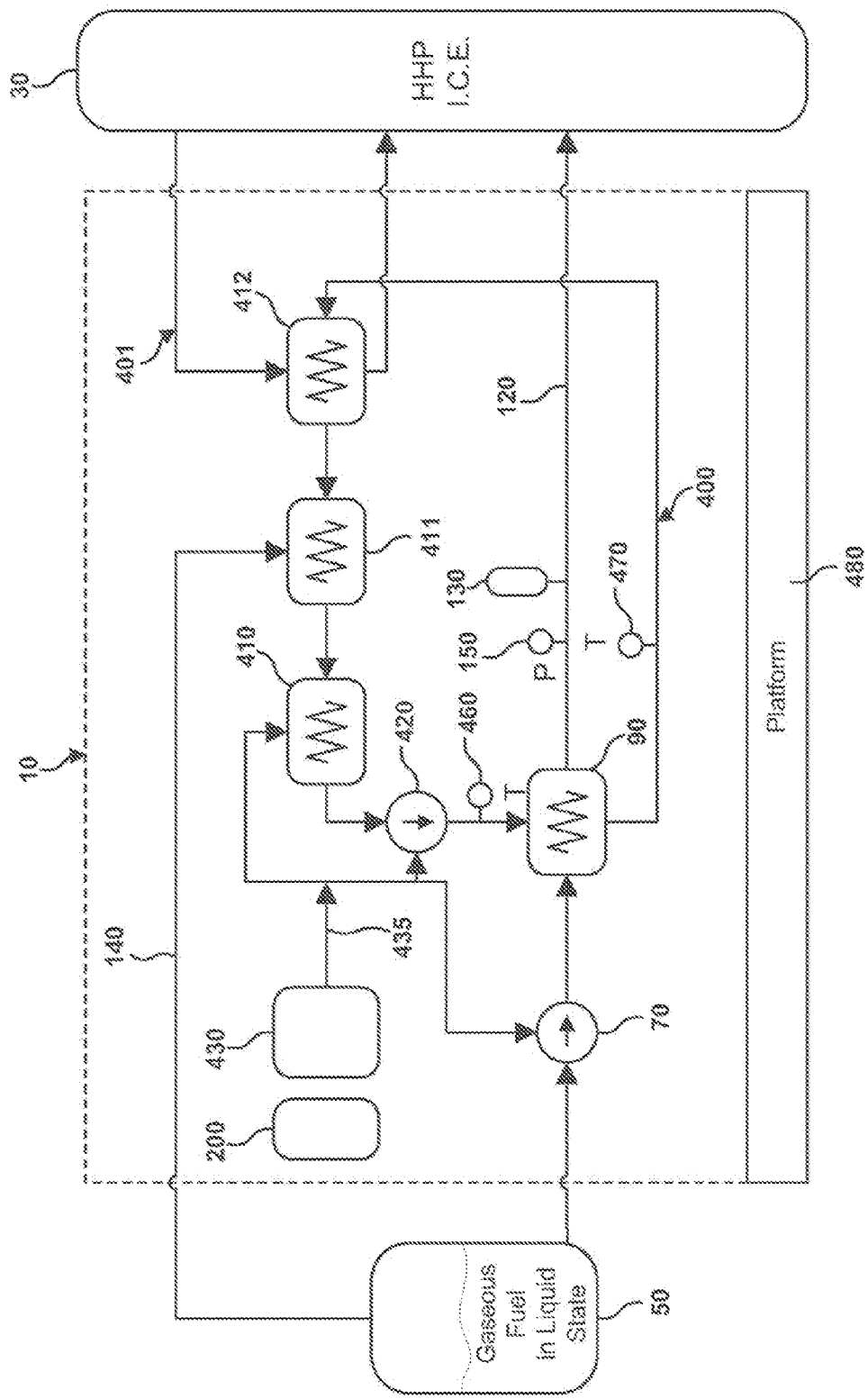
FIG. 7 is a schematic view of a fuel apparatus for supplying gaseous fuel from a liquid state to an internal combustion engine according to a seventh embodiment.

Referring now to FIG. 7, fuel apparatus 10 is shown according to a seventh embodiment. Heat exchange loop 400 comprises heat exchangers 410, 411 and 412. In operation liquefied gas from vessel 50 is vaporized by waste heat from engine 30, which is transferred to the fluid in loop 400 by heat exchanger 412. However, during periods when the engine coolant does not have high enough temperature to support the fuel flow requirement through vaporizer 90 and prevent, or at least reduce, freezing then either of heat exchangers 410 and 411 can be employed to increase the temperature of the fluid in loop 400. In some embodiments, heat exchanger 411 is employed to assist in vaporizing when the pressure of boil-off gas within vessel 50 is above a predetermined value such that venting the gas to atmosphere is prevented, or at least reduced.

Figure 8:
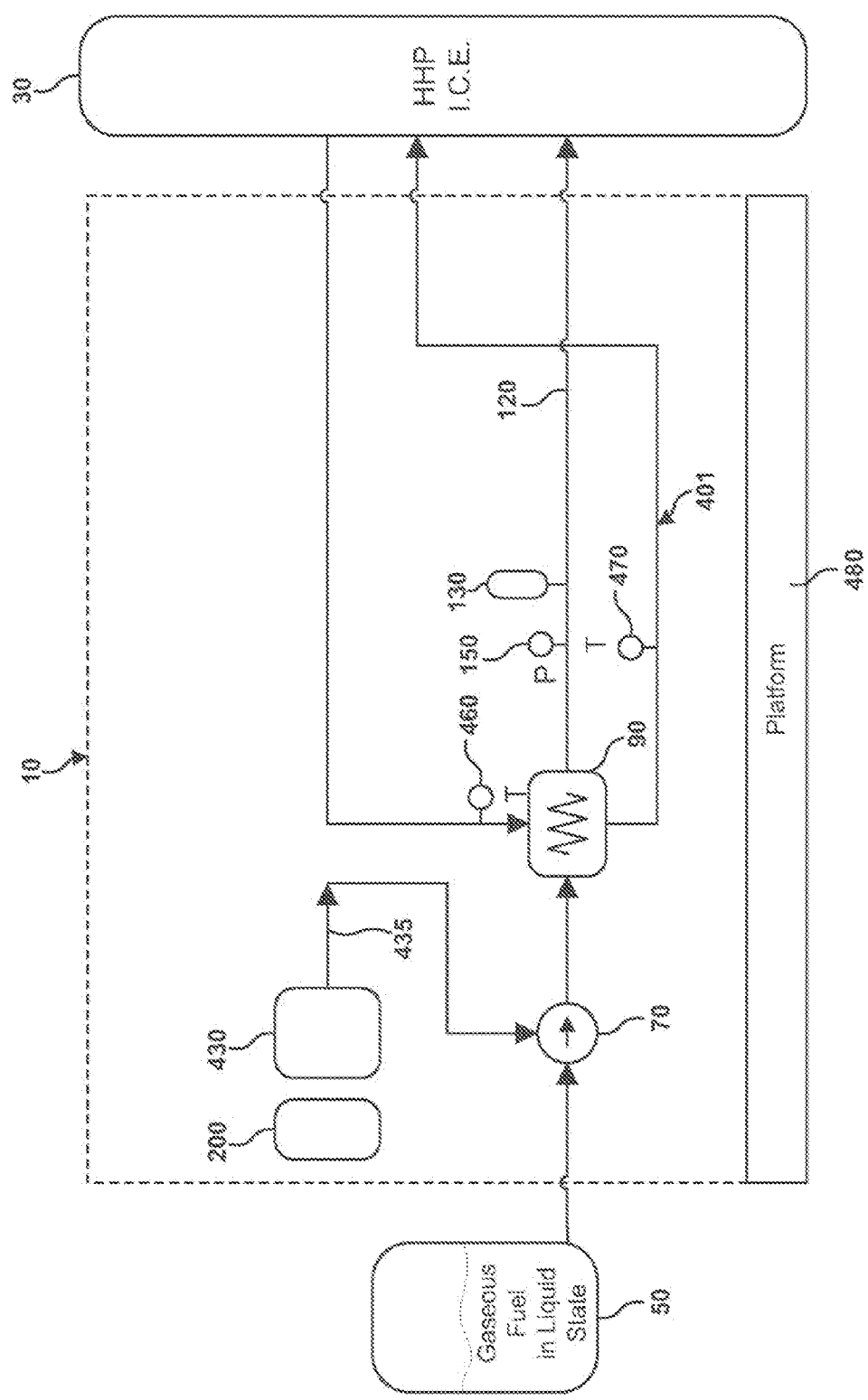
FIG. 8 is a schematic view of a fuel apparatus for supplying gaseous fuel from a liquid state to an internal combustion engine according to an eighth embodiment.

Referring now to FIG. 8, fuel apparatus 10 is shown according to an eighth embodiment. Engine coolant in loop 401 circulates through vaporizer 90 to transfer waste heat from engine 30 to vaporize the liquefied gas. Employing loop 401 instead of heat exchange loop 400 in FIGS. 1 through 7 simplifies the plumbing of apparatus 10. For example, heat exchanger 412 and pump 420, as best seen in FIG. 3, are not required in the embodiment of FIG. 8. However, depending upon the application it can be beneficial to employ pump 420 in loop 401 to assist with the circulation of the engine coolant.

Figure 9:
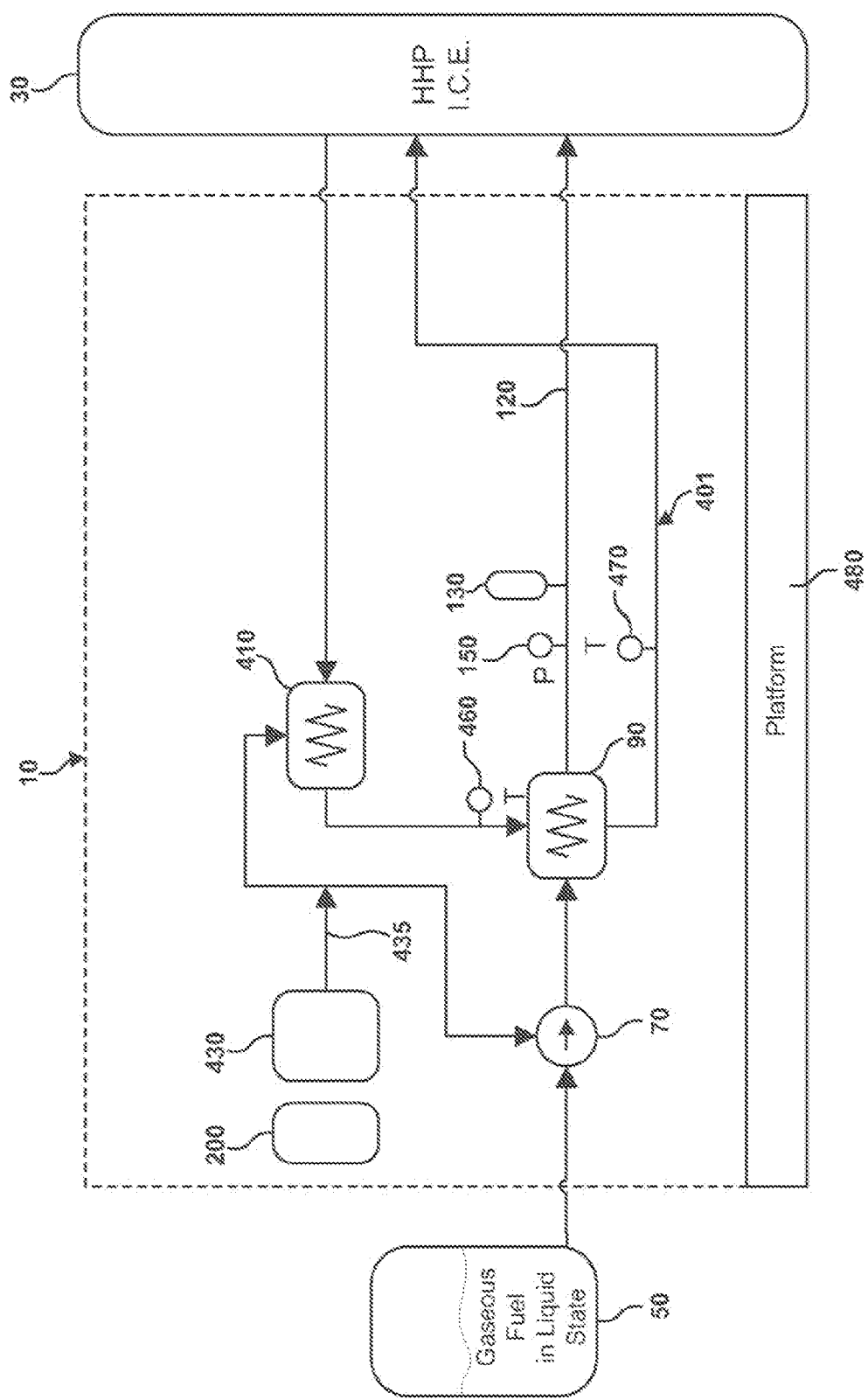
FIG. 9 is a schematic view of a fuel apparatus for supplying gaseous fuel from a liquid state to an internal combustion engine according to a ninth embodiment.

Referring now to FIG. 9, fuel apparatus 10 is shown according to a ninth embodiment. Similar to the embodiment of FIG. 4 heat exchanger 410 can be employed to elevate the temperature of the engine coolant in loop 401 depending upon the temperature of the engine coolant and the engine operating conditions of engine 30.

Figure 10:
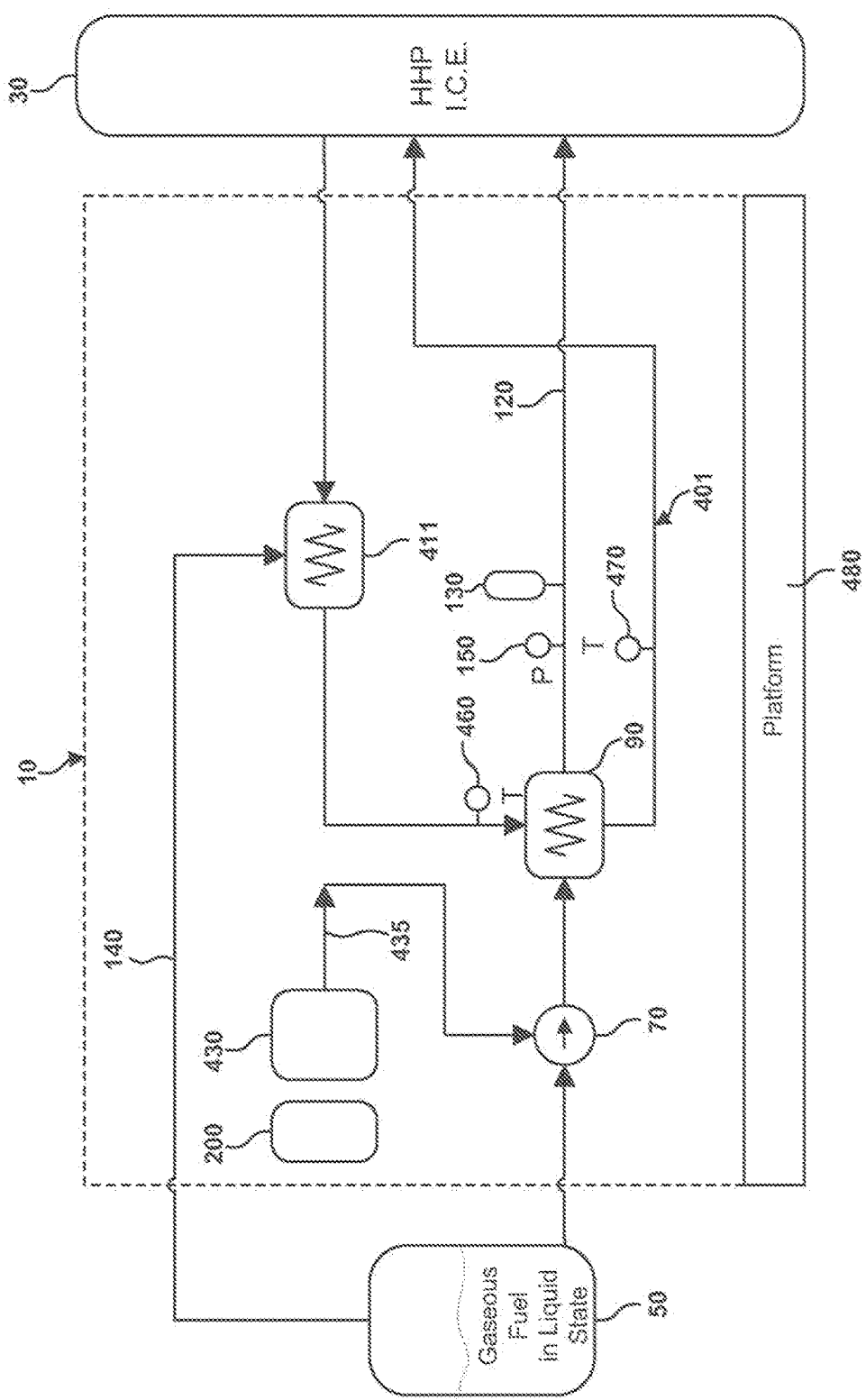
FIG. 10 is a schematic view of a fuel apparatus for supplying gaseous fuel from a liquid state to an internal combustion engine according to a tenth embodiment.

Referring now to FIG. 10, fuel apparatus 10 is shown according to a tenth embodiment. Similar to the embodiment of FIG. 5 heat exchanger 411 can be employed to elevate the temperature of the engine coolant in loop 401 depending upon the temperature of the engine coolant and the engine operating conditions of engine 30.

Figure 11:
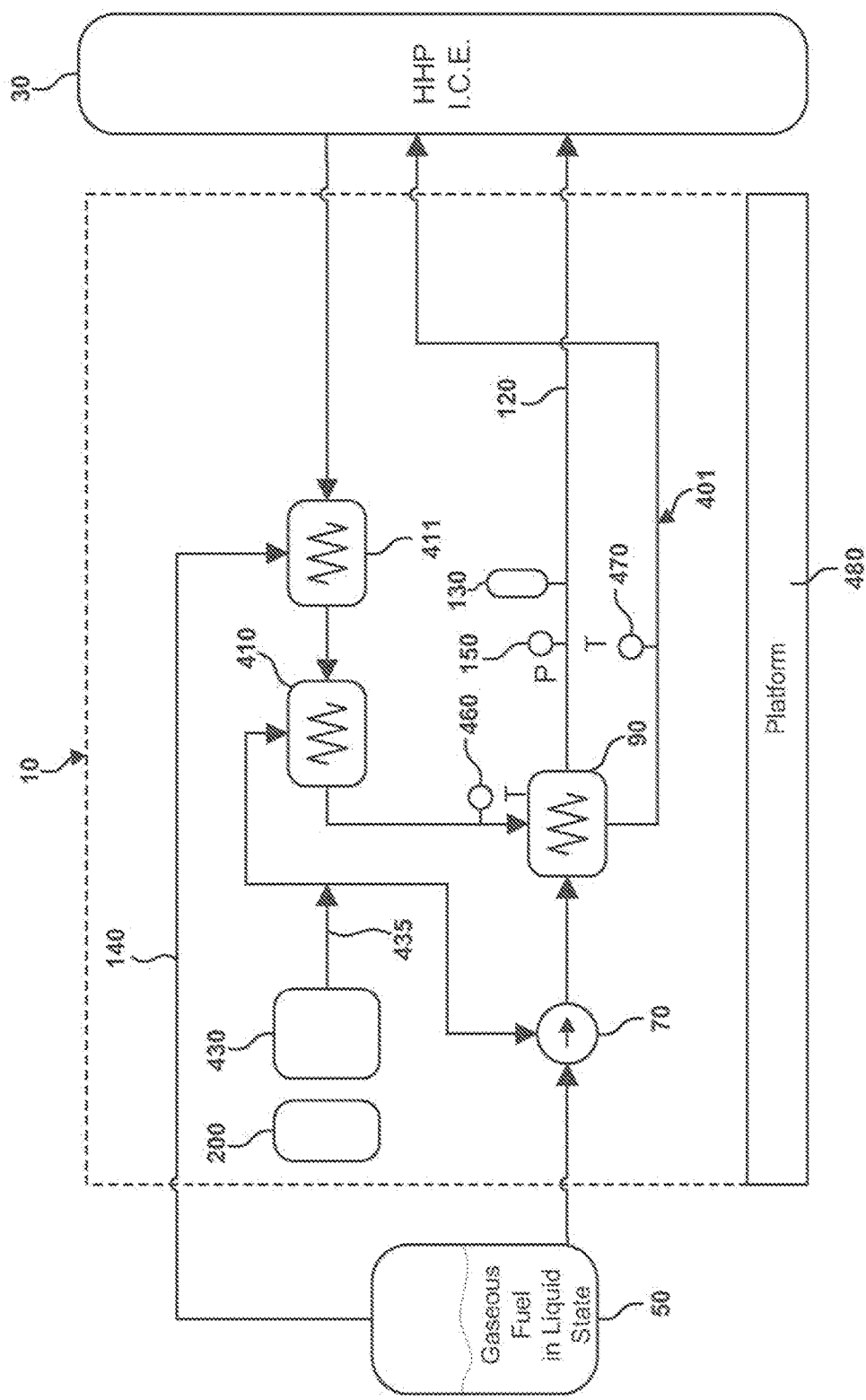
FIG. 11 is a schematic view of a fuel apparatus for supplying gaseous fuel from a liquid state to an internal combustion engine according to an eleventh embodiment.

Referring now to FIG. 11, fuel apparatus 10 is shown according to an eleventh embodiment. Similar to the embodiment of FIG. 7 heat exchangers 410 and 411 can be employed to elevate the temperature of the engine coolant in loop 401 depending upon the temperature of the engine coolant and the engine operating conditions of engine 30.

Figure 12:
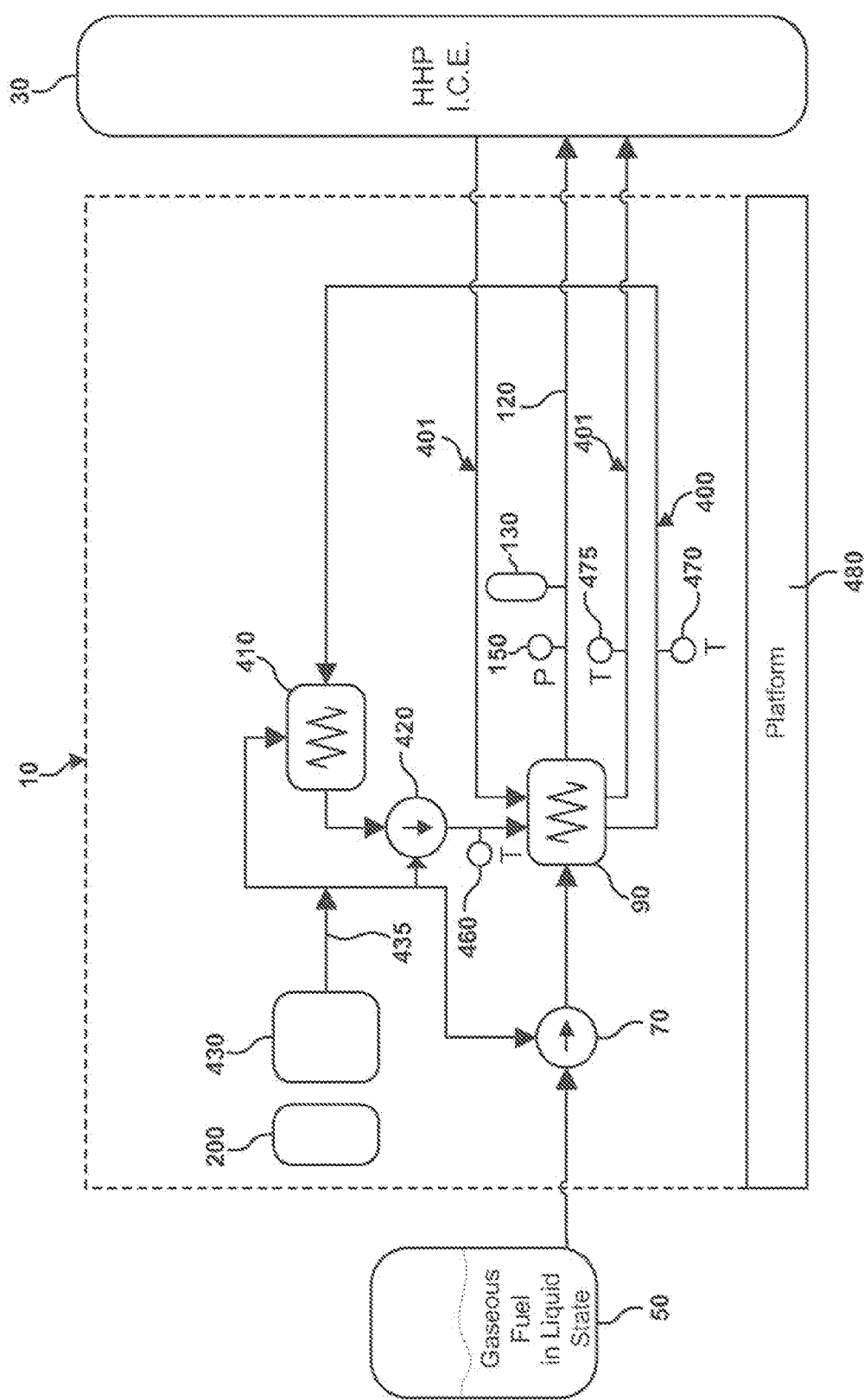
FIG. 12 is a schematic view of a fuel apparatus for supplying gaseous fuel from a liquid state to an internal combustion engine according to a twelfth embodiment.

Referring now to FIG. 12, fuel apparatus 10 is shown according to a twelfth embodiment that is similar to the previous embodiments and like parts have like reference numerals and are not described in detail, if at all. This embodiment combines the advantages of FIGS. 1 and 8. Vaporizer 90 employs heat exchange loops 400 and 401 to transfer heat to vaporize gaseous fuel from pump apparatus 70. In other embodiments vaporizer 90 can comprise two heat exchangers; one each for heat exchange loops 400 and 401. An additional temperature sensor 475 is illustrated in loop 401 for measuring the temperature of the heat exchange fluid. The advantage of this embodiment over the embodiments of FIGS. 3, 4 and 9 is improved heat exchange fluid flow characteristic in loops 400 and 401 since respective heat exchange fluids do not need to travel through an additional heat exchanger. A further advantage of this embodiment over the embodiment of FIGS. 3 and 4 is direct transfer of waste heat from the engine coolant in loop 401 to gaseous fuel in vaporizer 90 without the intermediate step of transferring waste heat to the heat exchange fluid in loop 400 through heat exchanger 412 in FIGS. 3 and 4. In the embodiments of FIGS. 4 and 9 when employing the engine coolant to vaporize the gaseous fuel, there can still be operating modes when there is insufficient heat. In these modes heat exchanger 410 must elevate the temperature of the heat exchange fluid above the temperature of the engine coolant. In contrast, in the present embodiment when there is insufficient heat from engine coolant, heat exchanger 410 must elevate the temperature of the heat exchange fluid in loop 400 above the temperature of the gaseous fuel in vaporizer 90, which is considerably less than the temperature of the engine coolant. This reduces the heating requirement for heat exchanger 410.

Figure 13:
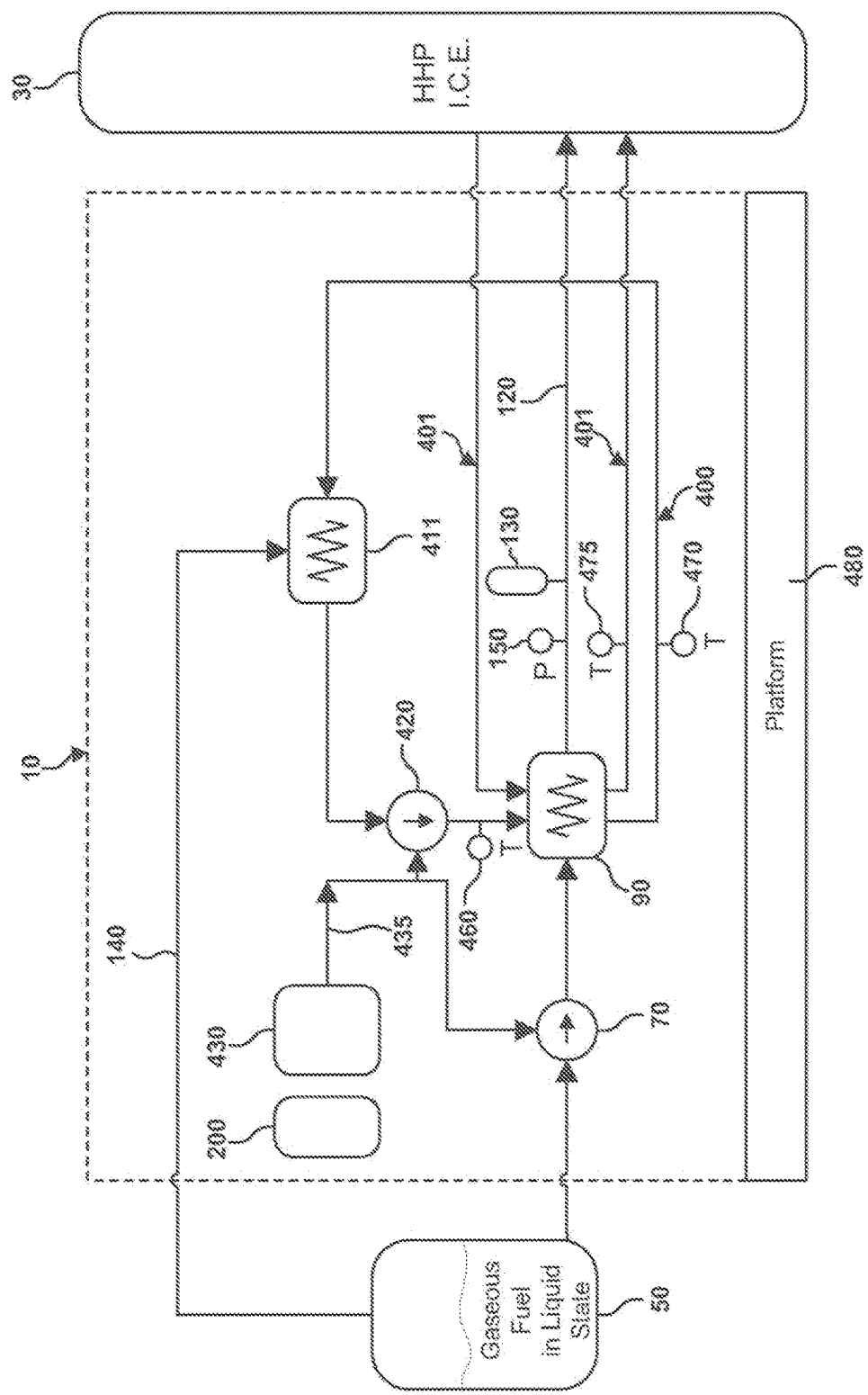
FIG. 13 is a schematic view of a fuel apparatus for supplying gaseous fuel from a liquid state to an internal combustion engine according to a thirteenth embodiment.

Referring now to FIG. 13 fuel apparatus 10 is shown according to a thirteenth embodiment. This embodiment is similar to the embodiment of FIG. 12 except that heat exchanger 411 is employed in loop 400 instead of heat exchanger 410. The advantages of the embodiment of FIG. 13 are similar to that of the embodiment of FIG. 12.

Figure 14:
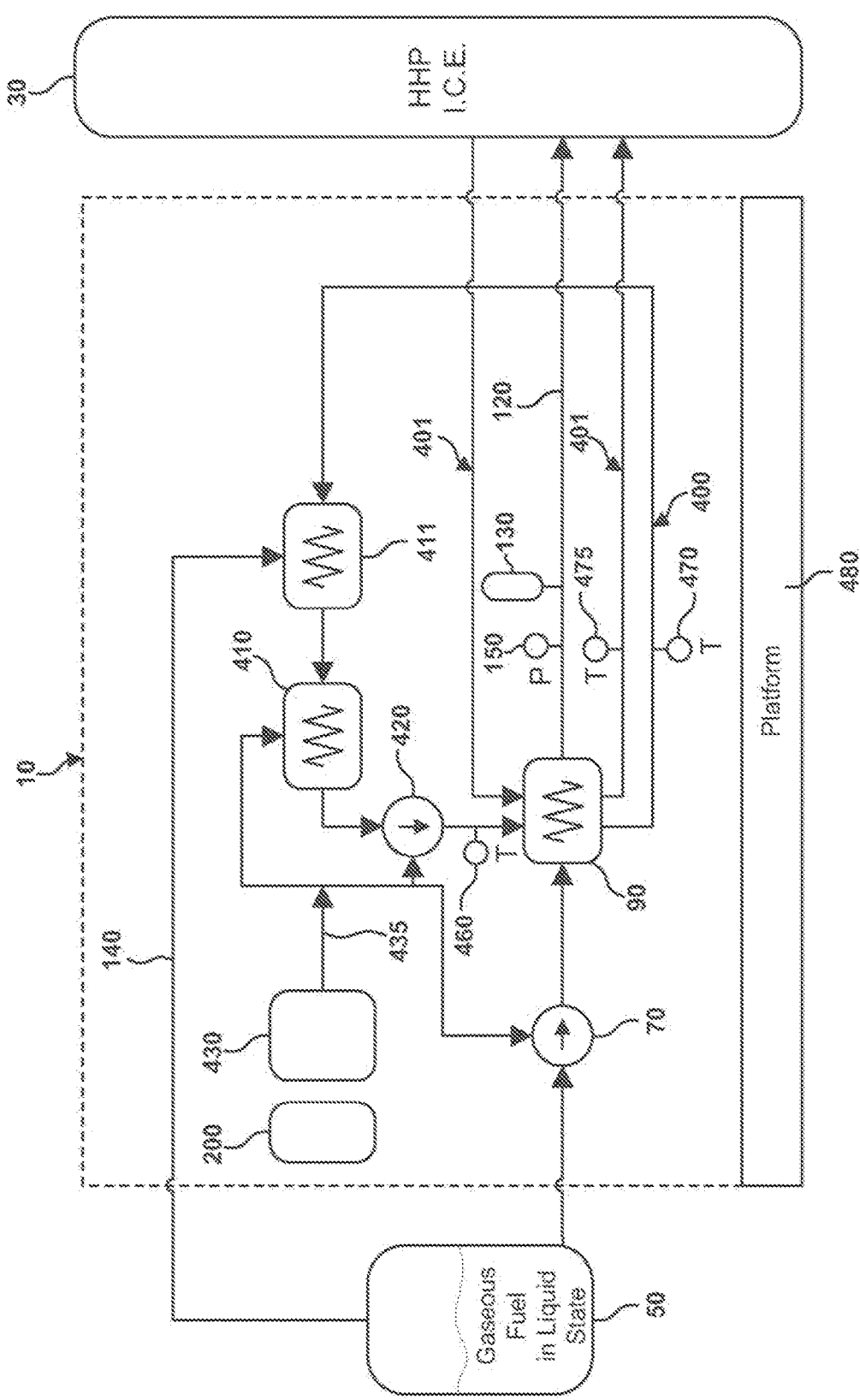
FIG. 14 is a schematic view of a fuel apparatus for supplying gaseous fuel from a liquid state to an internal combustion engine according to a fourteenth embodiment.

Referring now to FIG. 14 fuel apparatus 10 is shown according to a fourteenth embodiment. This embodiment is similar to the embodiments of FIGS. 12 and 13 except that both heat exchangers 410 and 411 are employed in heat exchange loop 400.

Referring to FIGS. 15, 16 and 17, electrical energy supply 430 is now described in more detail. In FIG. 15, supply 430 is illustrated according to one embodiment. Supply 430 comprises internal combustion engine 440, fuel supply 442 and electrical generator 444. Engine 440 is fuelled with a combustible fuel from supply 442 and drives generator 444 for generating electrical energy which is supplied to downstream consumers through conductors 435. Supply 430 transforms chemical energy stored in the combustible fuel into electrical energy in conductors 435. Engine 440 can be a conventional type of internal combustion engine consuming a conventional fuel. In some embodiments engine 440 is fuelled with any one of natural gas, ethane, methane, propane, biogas, landfill gas, dimethyl ether, hydrogen and mixtures thereof, as well as gasoline, ethanol-gasoline blends and diesel. The supply of electrical energy used by heat exchanger 410 to heat the fluid in loop 400 or 401 to prevent, or at least reduce, freezing of vaporizer 90 is available when engine 440 starts operating. An electronic controller of engine 440 can be employed by fuel apparatus 10 instead of controller 200 (seen in FIG. 1) for controlling the components of apparatus 10.

With reference to FIG. 16, electrical energy supply 430 is illustrated according to another embodiment. Supply 430 comprises a battery module 446 which supplies electrical energy to downstream consumers through conductors 435. Battery module 446 comprises one or more rechargeable batteries which can be a conventional type according to the application requirements. Supply 430 transforms chemical energy stored in the batteries into electrical energy conveyed over conductors 435. Electrical energy from engine 30 can be supplied over conductor 448 to module 446 to recharge the batteries during operation of the engine. In some embodiments battery module 446 can comprise electronics to control and monitor the recharging of the batteries. The electrical energy supplied over conductor 448 can be from a dynamic braking system (for example rheostatic braking and regenerative braking) associated with engine 30, such as found in locomotive applications, or from electrical energy generated due to mechanical work resulting from combustion of fuel from vessel 50.

With reference to FIG. 17, electrical energy supply 430 is illustrated according to yet another embodiment. Supply 430 in the embodiment of FIG. 17 combines the features of supply 430 in the embodiments of FIGS. 15 and 16. Battery module 446 supplies electrical energy over conductors 435 to downstream consumers. The batteries in module 446 can be recharged either by electrical generator 444 or by electrical energy supplied by engine 30 over conductors 448. It is advantageous to employ engine 30 to recharge the batteries in module 446 thereby minimizing the supply requirement for fuel supply 442. However, depending upon the current operating conditions of engine 30 there may not be enough electrical energy available to recharge the batteries in module 446. During these operating conditions engine 440 is employed to drive generator 444 to generate electrical energy that is employed to recharge the batteries.

Figure 18:
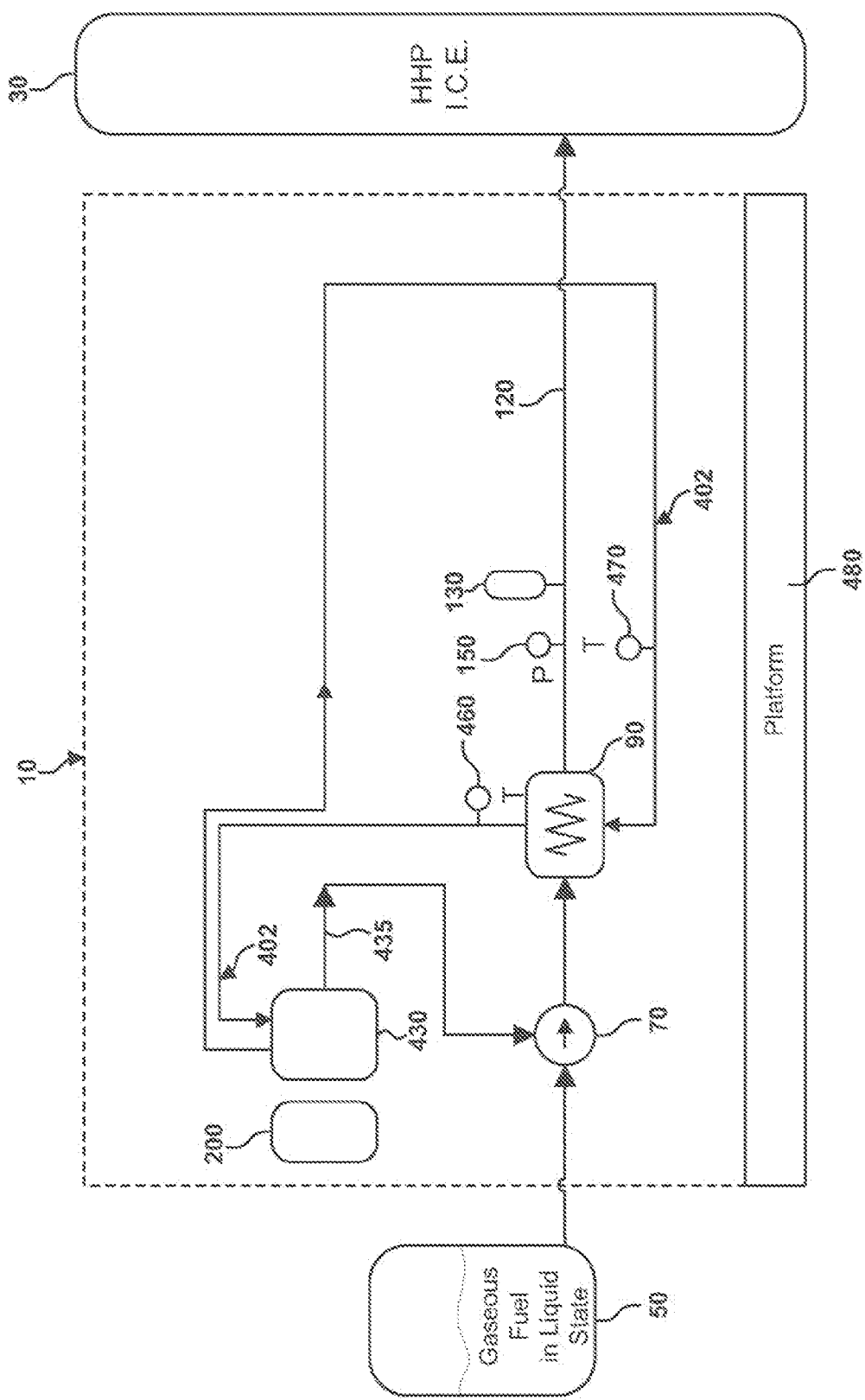
FIG. 18 is a schematic view of a fuel apparatus for supplying gaseous fuel from a liquid state to an internal combustion engine according to a fifteenth embodiment.

Referring now to FIG. 18, fuel apparatus 10 is shown according to a fifteenth embodiment. Heat exchange fluid of heat exchange loop 402 circulates through energy supply 430 where it collects waste heat from internal combustion engine 440 (referred to in relation to this and other embodiments and best shown in FIGS. 15 and 17). In one embodiment the heat exchange fluid is engine coolant of engine 440, and loop 402 is interconnected with the water jacket system of engine 440 such that a radiator of engine 440 receives the heat exchange fluid from vaporizer 90. This embodiment can vary the amount of heat generated to vaporize the gaseous fuel based on the fuel flow requirement of engine 30 by varying the load on engine 440. The electrical energy delivered over conductor 435 can be from electrical energy generated by engine 440 and/or electrical energy supplied by engine 30.

Figure 19:
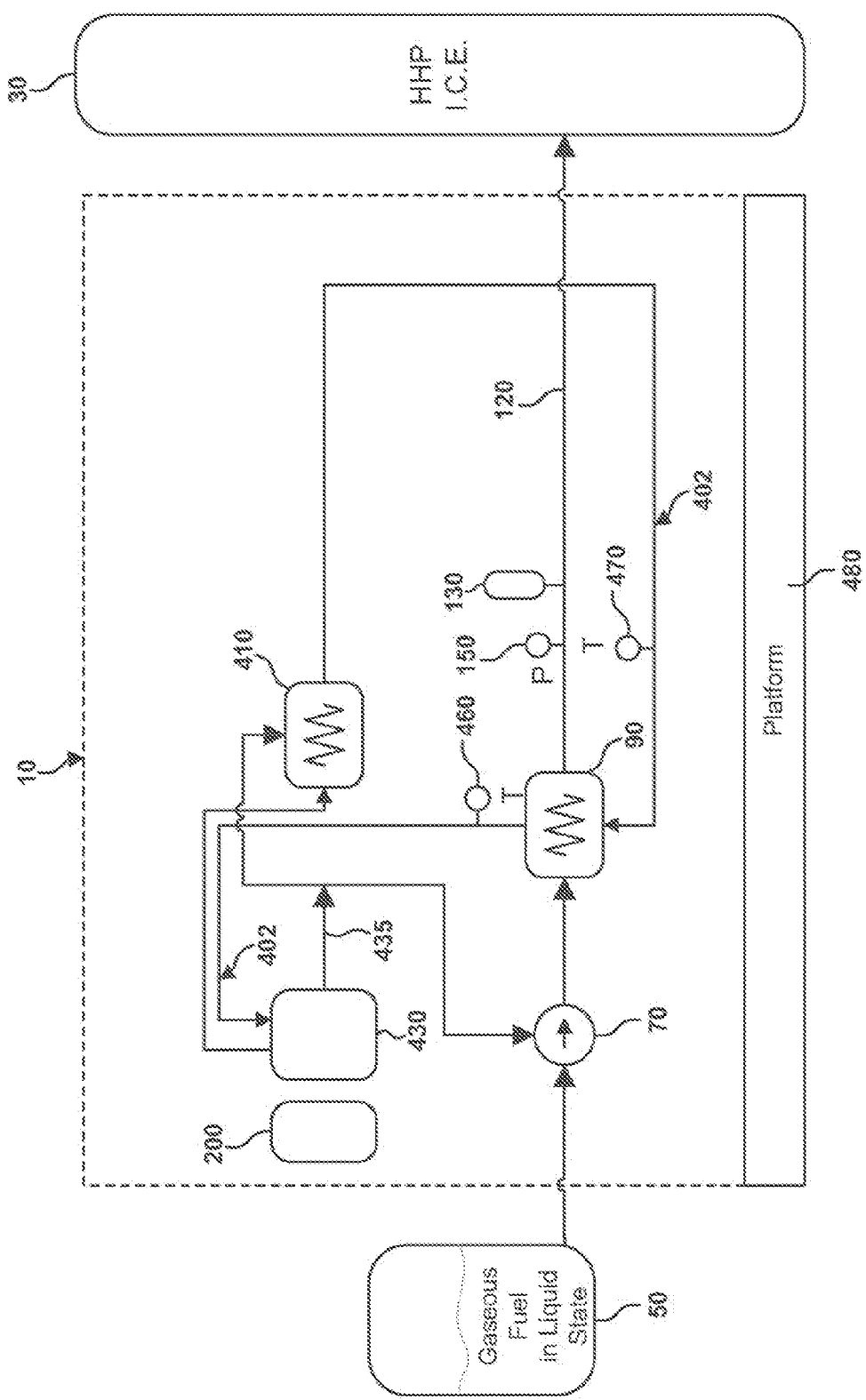
FIG. 19 is a schematic view of a fuel apparatus for supplying gaseous fuel from a liquid state to an internal combustion engine according to a sixteenth embodiment.

Referring now to FIG. 19, fuel apparatus 10 is shown according to a sixteenth embodiment. Similar to the embodiment of FIG. 18, fuel apparatus 10 further comprises heat exchanger 410 for elevating the temperature of the heat exchange fluid in loop 402 depending upon the temperature of the fluid and the engine operating conditions of engines 30 and 440.

Figure 20:
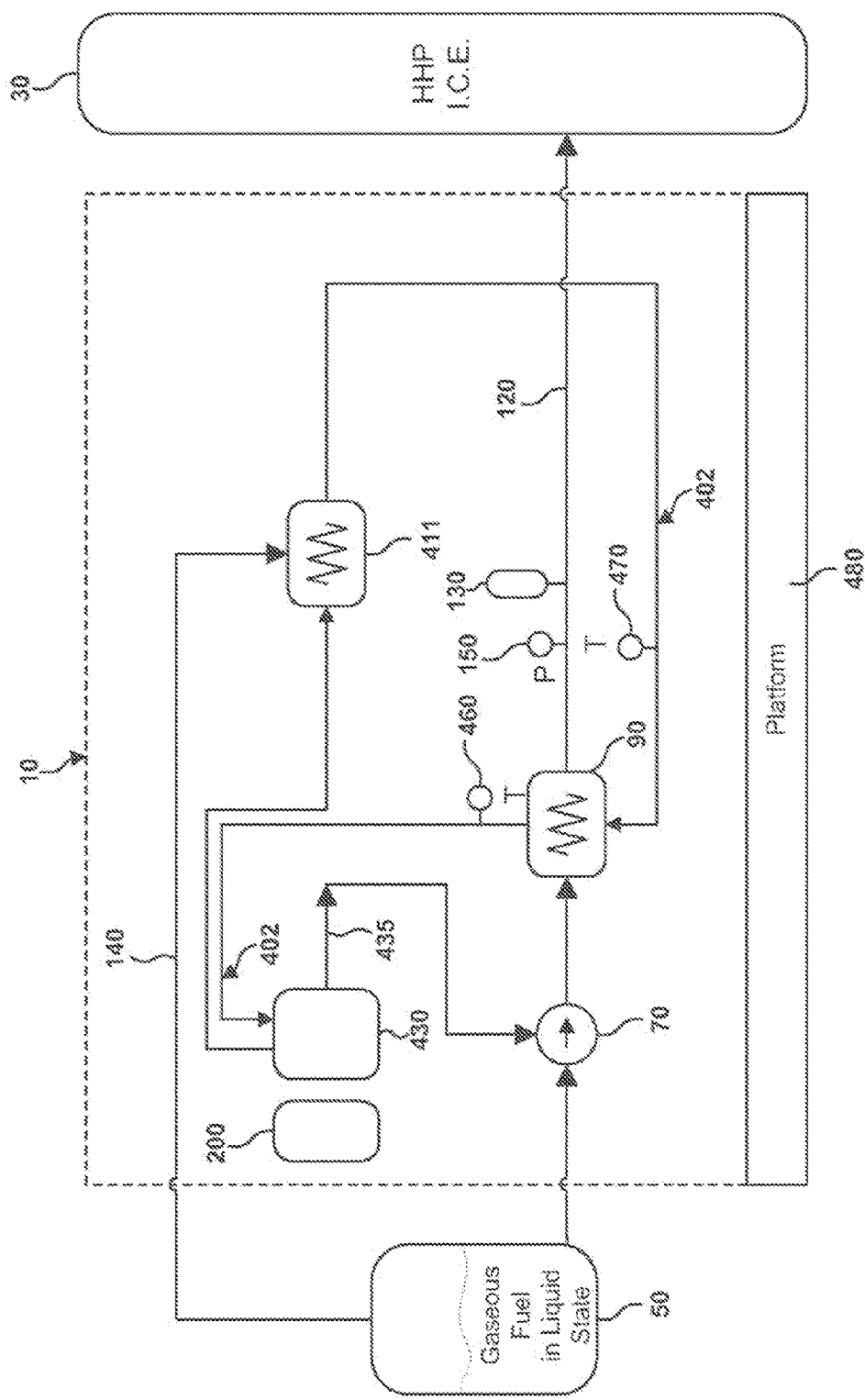
FIG. 20 is a schematic view of a fuel apparatus for supplying gaseous fuel from a liquid state to an internal combustion engine according to a seventeenth embodiment.

Referring now to FIG. 20, fuel apparatus 10 is shown according to a seventeenth embodiment. Similar to the embodiment of FIG. 18, fuel apparatus 10 further comprises heat exchanger 411 for elevating the temperature of the heat exchange fluid in loop 402 depending upon the temperature of the fluid and the engine operating conditions of engines 30 and 440.

Figure 21:
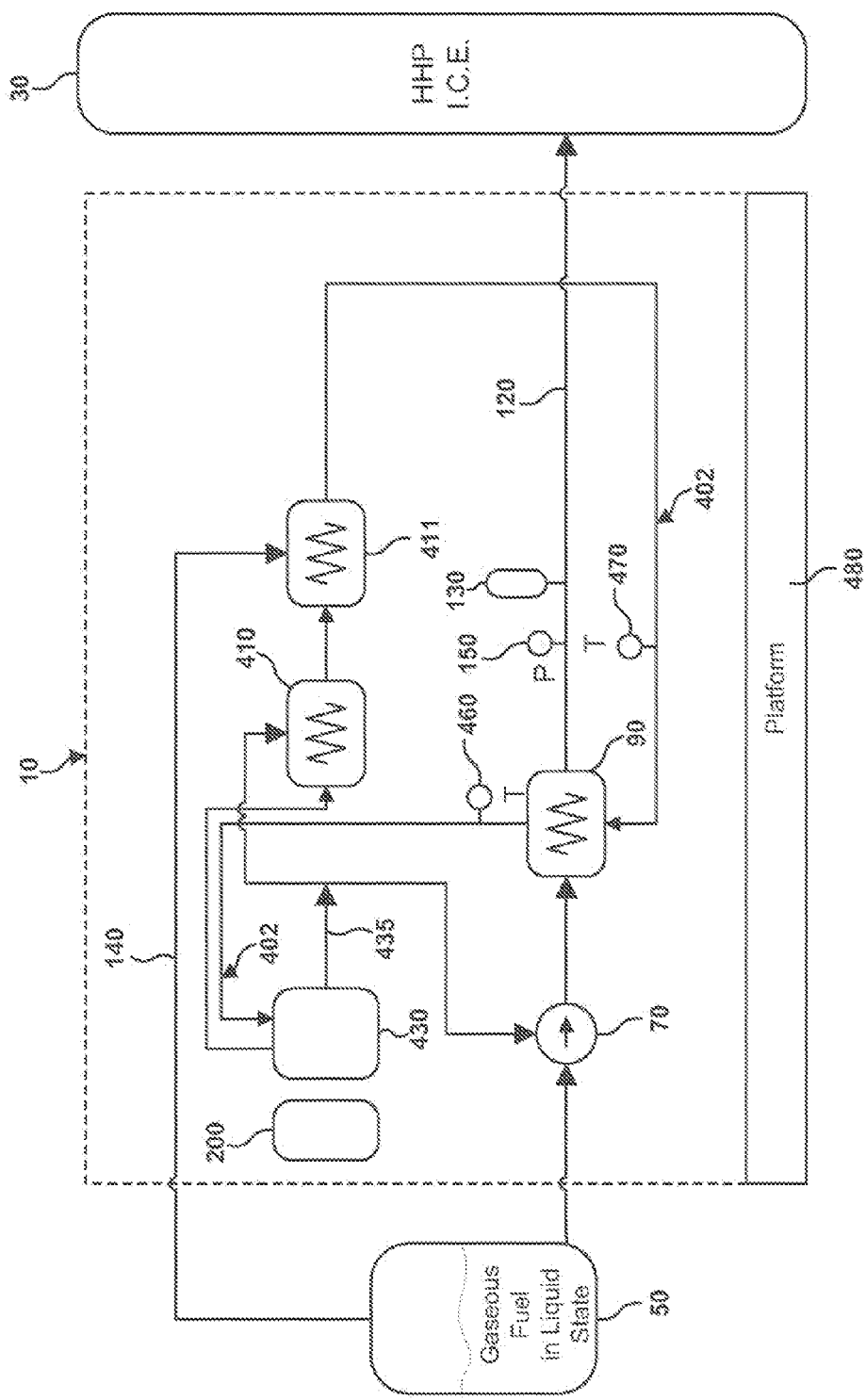
FIG. 21 is a schematic view of a fuel apparatus for supplying gaseous fuel from a liquid state to an internal combustion engine according to an eighteenth embodiment.

Referring now to FIG. 21, fuel apparatus 10 is shown according to an eighteenth embodiment. Similar to the embodiment of FIG. 18, fuel apparatus 10 further comprises heat exchangers 410 and 411 for elevating the temperature of the heat exchange fluid in loop 402 depending upon the temperature of the fluid and the engine operating conditions of engines 30 and 440. Fuel apparatus 10 combines the advantages of the embodiments of FIGS. 18 and 19.

Figure 22:
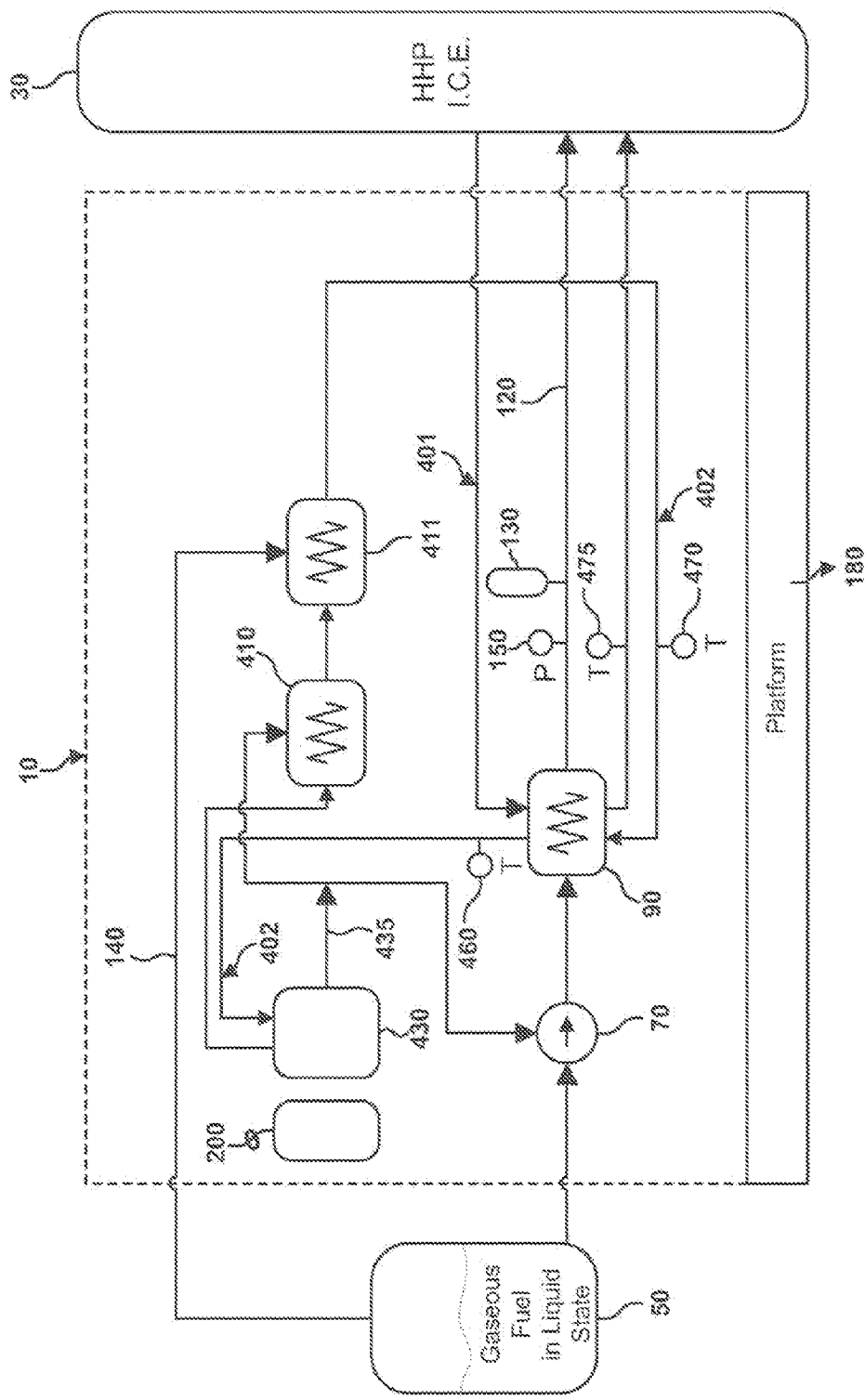
FIG. 22 is a schematic view of a fuel apparatus for supplying gaseous fuel from a liquid state to an internal combustion engine according to a nineteenth embodiment.

Referring now to FIG. 22, fuel apparatus 10 is shown according to a nineteenth embodiment. Fuel apparatus 10 comprises heat exchange loops 401 and 402. Heat exchangers 410 and 411 are each optional depending upon application requirements. Similar to the embodiment of FIG. 12, in other embodiments vaporizer 90 can comprise two heat exchangers; one each for heat exchange loops 401 and 402.

Figure 23:
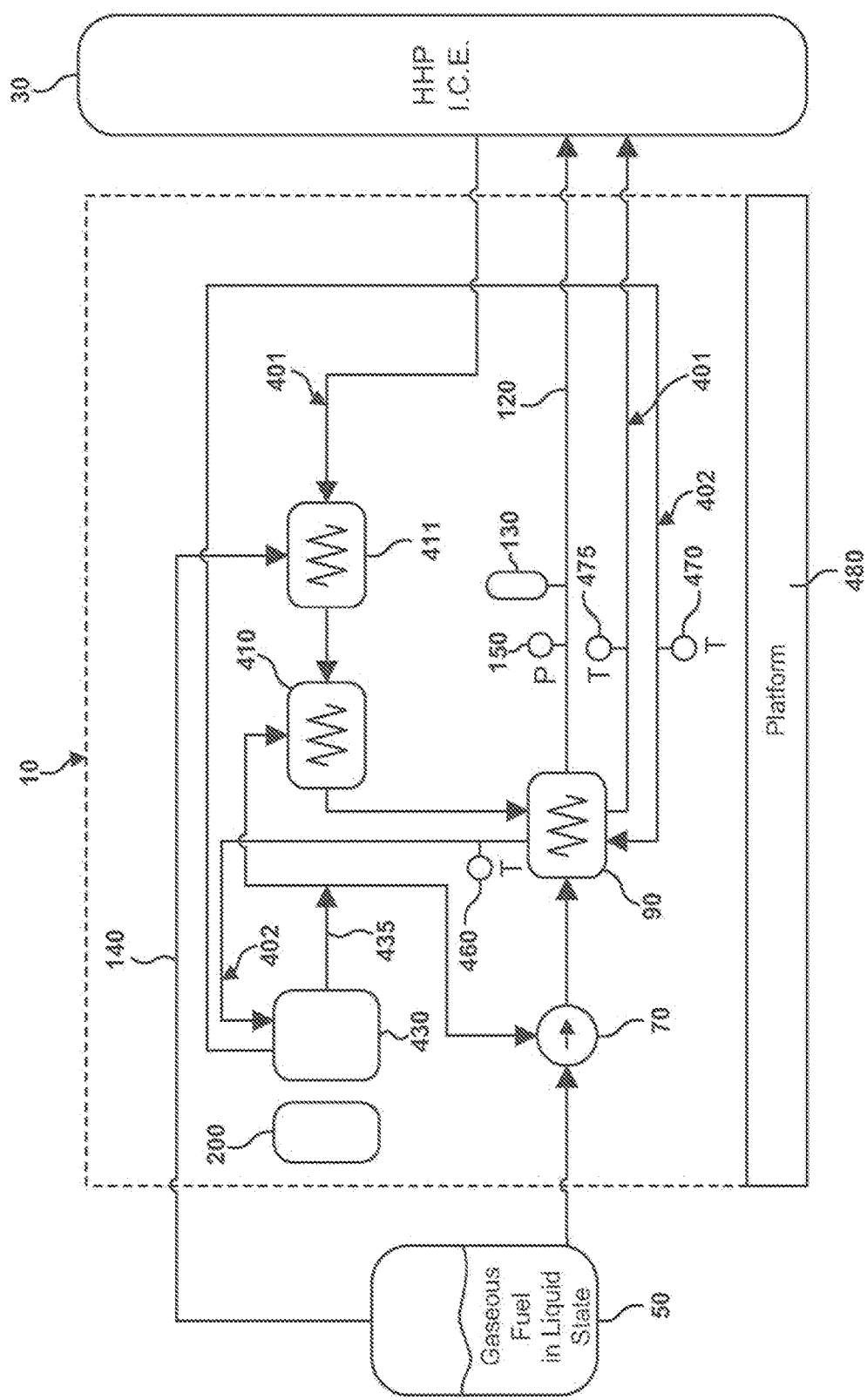
FIG. 23 is a schematic view of a fuel apparatus for supplying gaseous fuel from a liquid state to an internal combustion engine according to a twentieth embodiment.

Referring now to FIG. 23, fuel apparatus 10 is shown according to a twentieth embodiment. Fuel apparatus 10 comprises heat exchange loops 401 and 402. Heat exchangers 410 and 411 are each optional depending upon application requirements. Referring to both FIGS. 22 and 23, heat exchangers 410 and 411 can each be located in either of the loops 401 and 402, or both loops.

While particular elements, embodiments and applications of the present invention have been shown and described, it will be understood, that the invention is not limited thereto since modifications can be made by those skilled in the art without departing from the scope of the present disclosure, particularly in light of the foregoing teachings. For example, the numerous embodiments demonstrate that different combinations of components are possible within the scope of the claimed invention, and these described embodiments are demonstrative and other combinations of the same or similar components can be employed to achieve substantially the same result in substantially the same way.

What is claimed is:

1. A method for supplying gaseous fuel from a liquid state to a first internal combustion engine comprising:
   consuming a combustible fuel in a second internal combustion engine;
   driving an electrical generator with said second internal combustion engine, whereby said electrical generator generates electrical energy;
   pumping said gaseous fuel in said liquid state by transforming at least some of said electrical energy into mechanical work;
   vaporizing said gaseous fuel pumped from said liquid state with waste heat generated by operating said second internal combustion engine; and
   delivering said gaseous fuel vaporized from said liquid state to said first internal combustion engine, wherein a pressure of said gaseous fuel delivered to said first internal combustion engine is maintained within a predetermined range by said pumping.

2. The method of claim 1, further comprising vaporizing said gaseous fuel pumped from said liquid state with heat generated by transforming at least some of said electrical energy into thermal energy.

3. The method of claim 1, further comprising vaporizing said gaseous fuel pumped from said liquid state with heat generated by burning boil-off gas from said gaseous fuel in said liquid state.

4. The method of claim 1, further comprising:
generating heat by transforming at least some of said electrical energy into thermal energy at least before said first internal combustion engine starts;
vaporizing said gaseous fuel pumped from said liquid state with said heat;
generating waste heat by operating said first internal combustion engine; and
vaporizing said gaseous fuel pumped from said liquid state with said waste heat.

5. The method of claim 1, further comprising:
generating heat by burning boil-off gas from said gaseous fuel in said liquid state at least before said first internal combustion engine starts;
vaporizing said gaseous fuel pumped from said liquid state with said heat;
generating waste heat by operating said first internal combustion engine; and
vaporizing said gaseous fuel pumped from said liquid state with said waste heat from said first internal combustion engine.

6. An apparatus for supplying gaseous fuel from a liquid state to a first internal combustion engine comprising:
a second internal combustion engine for consuming a combustible fuel;
an electrical generator driven by said second internal combustion engine for generating electrical energy;
a pump for pumping said gaseous fuel in said liquid state comprising an energy converter for converting at least some of said electrical energy to mechanical energy which drives said pump;
a first heat exchanger for vaporizing said gaseous fuel received from said pump;
piping conduit for communicating waste heat in a first heat exchange fluid from said second internal combustion engine to said first heat exchanger, said waste heat in said first heat exchange fluid for vaporizing said gaseous fuel in said liquid state; and
a controller programmed to operate said pump to maintain a pressure of said gaseous fuel supplied to said first internal combustion engine within a predetermined range.

7. The apparatus of claim 6, further comprising a second heat exchanger for heating a second heat exchange fluid by transforming at least some of said electrical energy into heat, wherein said second heat exchange fluid transfers heat to said gaseous fuel in said first heat exchanger for vaporizing said gaseous fuel in said liquid state.

8. The apparatus of claim 6, further comprising a second heat exchanger for heating a second heat exchange fluid by generating heat by burning boil-off gas from said gaseous fuel in said liquid state, wherein said second heat exchange fluid transfers heat to said gaseous fuel in said first heat exchanger for vaporizing said gaseous fuel in said liquid state.

9. The apparatus of claim 6, further comprising a second heat exchanger for heating a second heat exchange fluid by transferring waste heat from said first internal combustion engine to said second heat exchange fluid, wherein said second heat exchange fluid transfers heat to said gaseous fuel in said first heat exchanger for vaporizing said gaseous fuel in said liquid state.

10. The apparatus of claim 6, further comprising a second heat exchanger for heating a second heat exchange fluid by transferring waste heat from said first internal combustion engine to said second heat exchange fluid; and
at least one more heat exchanger operable for one of:
(i) heating said second heat exchange fluid by transforming at least some of said electrical energy into heat; and
(ii) heating said second heat exchange fluid with heat generated by burning boil-off gas from said gaseous fuel in said liquid state, wherein said second heat exchange fluid transfers heat to said gaseous fuel in said first heat exchanger for vaporizing said gaseous fuel in said liquid state.

11. The apparatus of claim 6, further comprising a heat exchange loop comprising engine coolant from said first internal combustion engine as a second heat exchange fluid for transferring heat to said gaseous fuel in said first heat exchanger for vaporizing said gaseous fuel in said liquid state.

12. The apparatus of claim 11, further comprising at least one more heat exchanger operable for one of:
(i) heating said second heat exchange fluid by transforming at least some of said electrical energy into heat; and
(ii) heating said second heat exchange fluid with heat generated by burning boil-off gas from said gaseous fuel in said liquid state.

13. The apparatus of claim 6, further comprising:
a first heat exchange loop comprising engine coolant from said first internal combustion engine as a second heat exchange fluid for transferring heat to said gaseous fuel in said first heat exchanger for vaporizing said gaseous fuel in said liquid state; and
a second heat exchange loop comprising a third heat exchange fluid for transferring heat to said gaseous fuel in said first heat exchanger for vaporizing said gaseous fuel in said liquid state; at least one more heat exchanger operable for one of:
(i) heating said third heat exchange fluid by transforming at least some of said electrical energy into heat; and
(ii) heating said third heat exchange fluid with heat generated by burning boil-off gas from said gaseous fuel in said liquid state.

14. The apparatus of claim 6, further comprising a second heat exchanger for heating said first heat exchange fluid by transforming said at least some of electrical energy into heat thereby increasing a temperature of said first heat exchange fluid.

15. The apparatus of claim 6, further comprising a second heat exchanger for heating said first heat exchange fluid by burning boil-off gas from said gaseous fuel in said liquid state thereby increasing a temperature of said first heat exchange fluid.

* * * * *